(12) United States Patent
Beckett

(10) Patent No.: US 11,334,697 B1
(45) Date of Patent: May 17, 2022

(54) METHODS, SYSTEMS, AND COMPUTER PROGRAM PRODUCT FOR CHARACTERIZING AN ELECTRONIC DESIGN WITH EFFICIENT CELL CLONING

(71) Applicant: Cadence Design Systems, Inc., San Jose, CA (US)

(72) Inventor: Andrew David Beckett, Wokingham (GB)

(73) Assignee: Cadence Design Systems, Inc., San Jose, CA (US)

( * ) Notice: Subject to any disclaimer, the term of this patent is extended or adjusted under 35 U.S.C. 154(b) by 3 days.

(21) Appl. No.: 16/946,668

(22) Filed: Jun. 30, 2020

(51) Int. Cl.
  *G06F 30/31*  (2020.01)
  *G06F 111/20* (2020.01)

(52) U.S. Cl.
  CPC .......... *G06F 30/31* (2020.01); *G06F 2111/20* (2020.01)

(58) Field of Classification Search
  CPC ............................ G06F 30/31; G06F 2111/20
  See application file for complete search history.

(56) References Cited

U.S. PATENT DOCUMENTS

| | | | | |
|---|---|---|---|---|
| 7,555,739 B1* | 6/2009 | Ginetti | ............... | G06F 30/30 716/119 |
| 8,046,730 B1* | 10/2011 | Ferguson | ............... | G06F 30/39 716/139 |
| 8,281,272 B1* | 10/2012 | Ginetti | ............... | G06F 30/39 716/119 |
| 10,719,657 B1* | 7/2020 | Feuillette | ............... | G06F 30/30 |

* cited by examiner

*Primary Examiner* — Nghia M Doan
(74) *Attorney, Agent, or Firm* — Vista IP Law Group, LLP

(57) ABSTRACT

Disclosed are methods, systems, and articles of manufacture for characterizing an electronic design with efficient cell cloning. A cell instance corresponding to multiple similar cell instances in a view of an electronic design may be identified, where the cell instance is instantiated from a master parameterized cell. An analysis engine may be configured at least by associating a parameter of the master parameterized cell with multiple different parameter values respectively corresponding to the multiple similar cell instances. An analysis result including respective metric values corresponding to the multiple similar cell instances may be generated at least by performing an analysis that sweeps across the multiple different parameter values.

20 Claims, 22 Drawing Sheets

METHODS, SYSTEMS, AND COMPUTER PROGRAM PRODUCT FOR CHARACTERIZING AN ELECTRONIC DESIGN WITH EFFICIENT CELL CLONING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A semiconductor integrated circuit (IC) has a large number of electronic components, such as transistors, logic gates, diodes, wires, etc., that are fabricated by forming layers of different materials and of different geometric shapes on various regions of a silicon wafer. Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high-level behavior description of the IC device and translates this high-level design description into netlists at various levels of abstraction using a computer synthesis process. A netlist describes interconnections of nodes and components on the chip and includes information of circuit primitives such as transistors and diodes, their sizes and interconnections, for example.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools.

Modern electronic designs proceed through a series of design implementation tasks prior to manufacturing. These design implementation tasks involve multiple rounds of analyses, verification, error fixes, optimizations, ECOs (Engineering Change Orders), etc. at various stages of the electronic design implementation in several different abstractions (e.g., schematic, layout, etc.) Analyzing an electronic circuit design include various simulations, statistical analyses (e.g., regression analysis, Monte-Carlo analysis, etc.), various checks and verifications (e.g., between a design specification and circuit behavior), etc. An electronic design may exhibit different behaviors under different conditions (e.g., different inputs, different loads, different process technologies for manufacturing a single electronic design, variations in a manufacturing process (e.g., film thickness, resistivity, etc.), different operating conditions (e.g., different voltages, processes, temperatures (PVT), etc.), and/or different versions of a library, etc. so a multi-mode, multi-corner analysis is often performed to sweep across multiple devices (e.g., cells, circuit components, etc.) to characterize the electronic design.

Conventional approaches provide the capability to sweep across multiple devices in an electronic design in multi-mode, multi-corner analyses. Some of these conventional approaches even allow a user to switch among different views. Nonetheless, conventional approaches do not allow any switching of cells or libraries. Instead, conventional approaches require a testbench and at least one view for an electronic design under test. In the event of an electronic design having multiple similar instance types of a cell or block, these conventional approaches require the creation of a view for each of these multiple similar instance types due to the inability to switch among cells and thus need more memory space to accommodate these multiple views.

For example, a designer thus must execute a testbench for a specific view for characterization and repeat this process for all the views. These conventional approaches thus not only require much manual effort in creating individual testbenches for multiple views but, more critically, waste unnecessary computational resources in storing and executing each of the testbenches and the corresponding view, let alone the unnecessary delay in completing the underlying characterization.

An electronic design may include, however, multiple instances of a single master (e.g., a master cell, block, or macro that spawns multiple cell instances, block instances, and/or macro instances). For the ease of description, this document refers to a cell (e.g., a cell master, a cell instance, etc.) although it shall be noted that this reference to a cell may also encompass other circuit design components or groups of circuit components.

In a typical electronic design, a single master may spawn a much larger number of instances. These instances from a single master may be identical in some embodiments. In some other embodiments where a parameterized cell or pcell master is parameterized with one or more parameters, the multiple parameterized cell or pcell instances may or may not necessarily be identical to one another depending on, for example, which parameter is used to parameterized the cell. For example, a parameterized cell master may include a set of two input logic gates (e.g., NAND2, NOR2, AND2, OR2) with different drive strengths.

Nonetheless, at least some of these parameterized cell or pcell instances are similar to one another. Regardless of how much a family of cells instanced from a parameterized cell or pcell master is similar to one another, conventional approaches simply require a separate view or even a separate testbench for each of the instances in the family. Moreover, conventional approaches simply do not provide the capability to switch among different cell instances or libraries when these conventional approaches sweep across these similar variants. Some of these conventional approaches attempted to address this shortcoming by requiring a designer to manually create a common cell with a wrapper cellview for each different cell and use specifically coded sweeping capabilities in, for example, a simulation engine to sweep across different cells.

These conventional approaches nevertheless suffer from similar deficiencies as the aforementioned conventional approaches such as creating much more views and testbenches than necessary, inability to share a common testbench, unnecessary waste of computational resources, unnecessary delay in characterizations of an electronic design, etc. Some of these conventional approaches further suffer from additional deficiencies, drawbacks, and challenges because these conventional approaches require extensive changes in the underlying infrastructure. For example, these conventional approaches require extensive changes in the design hierarchy editor, a design elaborator, a design probing tool, a design netlisting tool in order to switch among different similar cells and/or among different libraries. Some other conventional approaches use a wrapper cellview to avoid extensive modifications in electronic design automation tools. Nonetheless, these latter conventional approaches inevitably alter the hierarchical structure of the underlying design and hence pose additional difficulties and challenges in subsequent characterizations of the underlying electronic design.

Therefore, there is a need for methods, systems, and computer program products for characterizing an electronic design with efficient cell cloning in a more accurate, efficient, and/or effective manner as well as to address at least the aforementioned issues and shortcomings.

SUMMARY

Disclosed are method(s), system(s), and article(s) of manufacture for characterizing an electronic design with efficient cell cloning in one or more embodiments. Some embodiments are directed at a method for characterizing an electronic design with efficient cell cloning. These embodiments may identify a cell instance corresponding to multiple similar cell instances in a view of an electronic design, where the cell instance is instantiated from a master parameterized cell. An analysis engine may be configured at least by associating a parameter of the master parameterized cell with multiple different parameter values respectively corresponding to the multiple similar cell instances. An analysis result including respective metric values corresponding to the multiple similar cell instances may be generated at least by performing an analysis that sweeps across the multiple different parameter values.

In some embodiments, a set of parameters that is shared by the multiple similar cell instances that are different from each other may be identified; and the master parameterized cell may be determined at least by determining a symbol parameterized cell and a schematic parameterized cell.

In some of the immediately preceding embodiments that identify the set of parameters, at least one shared device characteristic may be identified; and the set of parameters may be identified for analysis sweeping based at least in part upon the at least one shared device characteristic, wherein the set of parameters comprises at least one of a cell parameter, a library parameter, a symbol view parameter, or a schematic view parameter.

In addition or in the alternative, the symbol parameterized cell may be determined for the master parameterized cell; and the schematic parameterized cell may be determined for the master parameterized cell.

In some of the immediately preceding embodiments, the symbol parameterized cell may be determined at least by identifying the set of parameters, wherein the set of parameters comprises a symbol view parameter and further by identifying a first graphical representation of a first schematic master cell that corresponds to a first symbol view parameter value of the symbol view parameter.

In addition or in the alternative, the symbol parameterized cell may be determined at least by determining the first graphic representation at least by adding at least some of first connectivity of the first schematic master cell to the first graphical representation.

In some of the immediately preceding embodiments, the first graphical representation may be determined by copying or linking the at least some of the first connectivity information pertaining to the first schematic master cell to the first graphical representation. In some other embodiments, the first graphical representation may be determined by flattening a hierarchical level of a first symbol master to identify contents in the hierarchical level that has been flattened and further by copying or linking the contents in the hierarchical level to the first graphical representation.

In some of the immediately preceding embodiments, at least some missing contents that are not captured by flattening the hierarchical level may be copied or linked to the first graphical representation. A first source label that is linked to the first symbol view parameter value or the first symbol master may be optionally added or linked to the first graphical representation.

In some embodiments, the schematic parameterized cell may be determined at least by identifying the set of parameters, wherein the set of parameters comprises a schematic view parameter, by identifying first schematic view contents of a first schematic master cell that corresponds to a first schematic view parameter value of the schematic view parameter, and by adding or linking at least some of the first schematic view contents to the schematic parameterized cell that corresponds to the first schematic view parameter value.

In some of the immediately preceding embodiments, the at least some of the first schematic view contents may be added or linked at least by copying or linking the at least some of the first schematic view contents from the first schematic master cell to the schematic parameterized cell with respect to the first schematic view parameter value of the schematic view parameter in some embodiments.

In some other embodiments, the at least some of the first schematic view contents may be added or linked at least by flattening a hierarchical level of the first schematic master cell to identify contents in the hierarchical level that has been flattened and further by copying or linking the contents in the hierarchical level to the schematic parameterized cell.

In some of the immediately preceding embodiments, the schematic parameterized cell may be further determined at least by copying or linking at least some missing contents that are not captured by flattening the hierarchical level to the schematic parameterized cell. In addition or in the alternative, a first source label that is linked to the first schematic view parameter value or the first schematic master cell may be optionally added or linked to the schematic parameterized cell.

Some embodiments are directed at a hardware system that may be invoked to perform any of the methods, processes, or sub-processes disclosed herein. The hardware system may include at least one microprocessor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

Additional and other objects, features, and advantages of the disclosure are described in the Detail Description, figures, and claims.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present disclosures briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 5A illustrates a portion of a simplified electronic design to which various techniques described may be applied to characterize the simplified electronic design in one or more embodiments.

FIG. 5B illustrates a portion of an example user interface to facilitate the application of various techniques described herein for characterizing an electronic design with efficient cell cloning in one or more embodiments.

FIG. 5C illustrates the portion of the simplified electronic design to which some techniques described apply for characterizing the simplified electronic design with efficient cloning in one or more embodiments.

FIG. 5D illustrates an example content of an instance in the simplified electronic design illustrated in FIG. 5C in one or more embodiments.

FIG. 5E illustrates another portion of an example user interface to facilitate the application of various techniques described herein for characterizing an electronic design with efficient cell cloning in one or more embodiments.

FIG. 5F illustrates a portion of another example user interface showing a result of characterizing an electronic design with efficient cell cloning in one or more embodiments.

FIG. 5G illustrates a portion of another example user interface showing a result of characterizing an electronic design with efficient cell cloning in one or more embodiments.

FIG. 5H illustrates an example of efficient cell cloning of multiple instances by using a schematic parameterized cell and a symbol parameterized cell in one or more embodiments.

FIG. 5I illustrates another example of efficient cell cloning of multiple instances by using a schematic parameterized cell and a symbol parameterized cell in one or more embodiments.

FIG. 5J illustrates yet another example of efficient cell cloning of multiple instances by using a schematic parameterized cell and a symbol parameterized cell in one or more embodiments.

DETAILED DESCRIPTION

Figure 1:
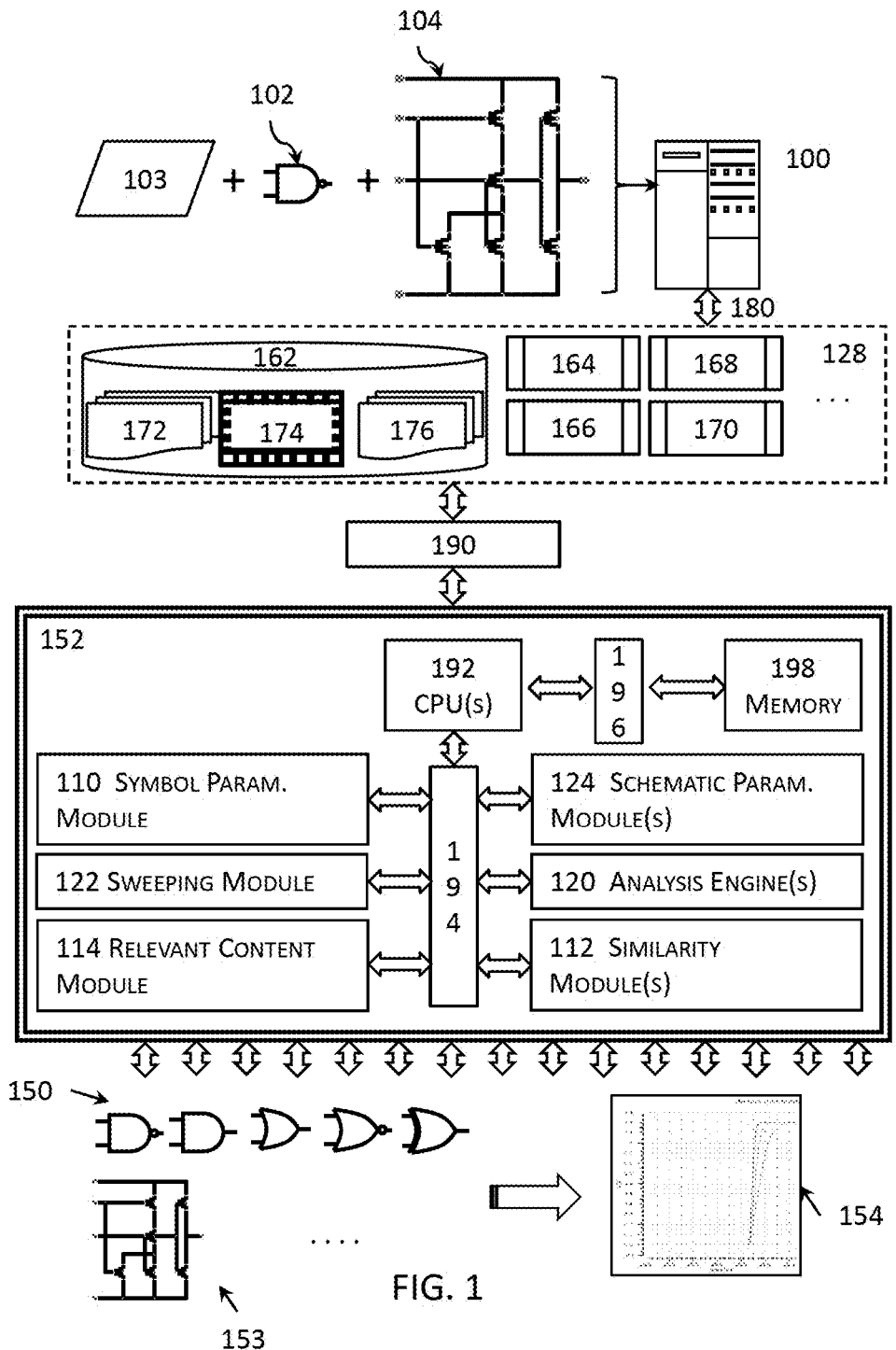
FIG. 1 illustrates a high-level block diagram of a simplified system for characterizing an electronic design with efficient cell cloning in one or more embodiments.

Various embodiments described herein are directed to characterizing an electronic design with efficient cell cloning.

To address at least the aforementioned shortcomings and challenges of conventional approaches described in the Background section, various embodiments described herein enable an EDA (Electronic Design Automation) tool to characterize of an electronic design in a multi-physics domain (e.g., electrical behaviors, physical behaviors, etc.) with an analysis that sweeps across at least a plurality of similar cell instances that are instantiated from a cell master while allowing switching of cells and/or libraries with a single testbench in some embodiments or with multiple testbenches in some other embodiments. The plurality of similar instances may be collectively referred to as respective instances of a "CellSwap" component that is parameterized with one or more parameters having one or more respective parameter values (e.g., a schematic parameterized cell or pcell value or a symbol parameterized cell or pcell value). It shall be noted that although some embodiments refer to a multi-mode, multi-corner analysis, various techniques described herein apply with full and equal effects to any other analyses and provides the capabilities of cell switching and/or library switching directly within an analysis performed on an electronic design, instead of or rather than introducing any wrapper views that disturb the original hierarchies of the electronic design or requiring extensive changes or any changes at all to existing electronic design automation tools.

More particularly, some embodiments described herein creates a parameterized cell or pcell master based at least in part upon a plurality of parameters. More specifically, two parameterized cells or pcells will be created for each class of similar cell instances. These two cells include a symbol parameterized cell or pcell and a schematic parameterized cell or pcell. In some embodiments, a class of similar cells includes, for example, cells that have the same pinouts, cells that have the same pin names, cells that have the same pin locations, etc. Both the symbol parameterized cell or symbol pcell and the schematic parameterized cell or schematic pcell include one or more parameters into which one or more corresponding parameter values may be passed during the instantiation of a particular instance from the master.

Some examples of the one or more parameters include, without limitation, a library parameter, a cell parameter, a symbol view parameter, a schematic view parameter, etc. It shall be noted that these one or more parameters may be utilized to enable cell and library switching during an analysis (e.g., a multi-mode, multi-corner analysis) although one or more additional parameters other than the aforementioned parameters may also be included in a parameterized cell or pcell master to further define the parameterized cell or pcell master.

In some embodiments, these one or more parameters may include a symbol view parameter that receives first input data that links to a symbol or a view for an instantiated instance of the master. The plurality of parameters may also include a schematic view parameter that receives second input data that links to a flat or hierarchical schematic or schematic view for an instantiated instance of the master.

In some embodiments, the plurality of parameters may include a cell parameter that receives third input data that links to the cell (a block, a macro, etc.) from which an instantiated instance of the master comes. In addition or in the alternative, the plurality of parameters may include a library parameter that receives fourth input data that links to a library for or from which an instantiated instance of the master comes.

With the cell view parameter, an instance instantiated from the corresponding parameterized master will appears just like the symbol of an instance of a non-parameterized master (e.g., one specified by, for example, the library, the corresponding cell, etc.) Moreover, because the master is parameterized, changing a parameter value of a parameter may result in a change in the graphical symbol (e.g., from an AND gate to an OR gate), the number and/or location(s) of pins, and/or the pinout in the instantiated symbol.

More particularly, some embodiments described herein generate two parameterized cell or pcell—a symbol parameterized cell or pcell and a schematic parameterized cell or pcell—for a parameterized cell or pcell master. The symbol parameterized cell or pcell includes a generic graphic symbol or information linking to a generic graphic symbol representing the circuit component(s) when an instance of the parameterized master is instantiated in an abstraction (e.g., the schematic abstraction) of an electronic design so that the resulting schematic appear exactly the same as the schematic would appear in conventional approaches despite the underlying masters and instantiation process are different.

Furthermore, the symbol parameterized cell or pcell further includes one or more specific graphic symbols or information linking to the one or more specific graphic symbols respectively representing the circuit component(s) when an instance of the parameterized master is instantiated with one or more parameter values for one or more parameters of the parameterized master in an abstraction of an electronic design when the one or more parameter values specifically define what the instance is. In these embodiments, the graphic representation of a first instance changes according to the aforementioned one or more parameter values passed into the first instance during the instantiation of the first instance. Some of these embodiments represent each instance of a circuit component instantiated from a parameterized master in an abstraction in exactly the same graphical representation as if each instance is instantiated from a non-parameterized master in conventional approaches although the parameterized master is characterized by providing different graphical representations or symbols for different circuit components depending at least in part upon the parameter value(s) passed into these different circuit components during instantiation.

Regarding the schematic parameterized cell or pcell for a parameterized master cell (or a block, macro, group of circuit components, etc.), the parameterized cell or pcell master also includes a generic flat or hierarchical schematic view or information linking to the generic flat or hierarchical schematic view that may be used to represent an instance instantiated from the parameterized or pcell master in some embodiments. In some other embodiments, the parameterized cell or pcell master also includes one or more specific flat or hierarchical schematic views or information respectively linking to the one or more specific flat or hierarchical schematic views that may be used to represent different, specific instances instantiated from the parameterized or pcell master based on one or more parameter values passed into the instantiation process of these different, specific instances.

In these latter embodiments, when an instance of the parameterized master (and hence the corresponding schematic parameterized cell or pcell) is instantiated with one or more parameter values for one or more parameters of the parameterized master (or for the corresponding schematic parameterized cell or pcell) in an abstraction (e.g., a schematic abstraction) of an electronic design, these one or more parameter values specifically define what the instance is. In these embodiments, the graphic representation of an instance changes according to the aforementioned one or more parameter values passed into the instance during instantiation.

Some of these embodiments represent the schematic of each instance of a circuit component instantiated from a parameterized master in exactly the same schematic design (e.g., the schematic specified in a library, a version of a library, etc.) as if each instance is instantiated from a conventional, or non-parameterized master in conventional approaches although the parameterized master is characterized by providing different schematic representations or views for different circuit components depending at least in part upon the parameter value(s) passed into these different circuit components during instantiation. In some embodiments, an instance of the schematic parameterized cell or pcell may be flat (e.g., by promoting all hierarchies to the highest hierarchy), whereas the instance or another instance of the schematic parameterized cell or pcell may be hierarchical in some other embodiments. In these latter embodiments, the schematic instance may be descended into to display each different hierarchy of the one or more hierarchies of the schematic instance with the correct connectivity, graphical representation, etc. as if each instance is instantiated from a non-parameterized master in conventional approaches.

With at least the symbol parameterized cell or pcell and the schematic parameterized cell or pcell for a master parameterized cell or master pcell, an instance of the master may be placed in an electronic design. In some embodiments, the instance may be flattened by promoting one or more hierarchical levels in the instance below the top or highest hierarchical level to the top or highest hierarchical level in order to preserve connectivity, the number of pins, and/or the pinout, etc. In some embodiments, a flattening process may not bring some information or contents pertaining or relevant to the design of the instance to the destination hierarchical level.

In these embodiments, any information or contents required or desired by various design tasks (e.g., an analysis, an ECO, a fix, an optimization, a closure task, etc.) may also be brought to (e.g., via a copy or duplication process) the destination hierarchical level. For example, one or more special layers may or may not necessarily be brought to the destination hierarchical level during the aforementioned flattening process. In this example, at least one of these one or more special layers or a portion thereof may be copied to the destination hierarchical level when the at least one layer or the portion thereof is required or desired by one or more further design tasks.

It shall be noted that the copying or duplication of such information or contents that are not brought to the destination hierarchical level during flattening may be performed at any time. For example, when an analysis task determines that certain information or contents of an instance are not in the electronic design of interest with the instance instantiated from its parameterized cell or pcell master, such certain information or contents may be copied or duplicated at any time before the conclusion of the analysis task via, for example, an inter-process call (or IPC) or a message.

In some embodiments, one or more properties (e.g., a cellview property, etc.) of the parameterized cell or pcell master may be propagated from the parameterized cell or pcell master to one or more parameterized cell or pcell submasters (e.g., symbol parameterized cell or pcell, a schematic parameterized cell or pcell, etc.) so that the symbol parameterized cell or pcell and/or the schematic parameterized cell or pcell inherits these one or more properties of the master parameterized cell or pcell. In addition or in the alternative, a schematic parameterized cell or pcell submaster or an instance thereof may be augmented or modified with additional information such as a label that indicates where the source cellview originated from for the schematic parameterized cell or pcell submaster or an instance thereof.

It shall be noted that although various embodiments described herein refer to the generation and user of a schematic parameterized cell or pcell submaster and a symbol parameterized cell or pcell submaster for a group of circuit components (e.g., a parameterized cell or pcell master), the connectivity information of the original schematic design may be preserved. For example, various identifiers of nets, net segments, pins, terminals, pads, etc. in the original schematic design may be preserved so as to completely eliminate or at least reduce any disturbance to the entire electronic design flow or at least a portion thereof.

As a practical working example, an LVS (layout versus schematic) check or verification may extract (e.g., from a layout database) circuit components in a layout by using, for example, area-based operations to determine the device recognition layer(s), the pin(s), terminal(s), or pad(s) of the device recognition layer(s), the wire(s), via(s), location(s) of the pin(s)/terminal(s)/or pad(s), and/or measurement(s), etc.

The LVS check or verification may further combine the extracted components into series and/or parallel combinations and generate a netlist representation of the layout and compare the netlist representation or a portion thereof to a corresponding netlist or the correspond portion in the schematic by referencing, for example, a specific identifier of a pin or net in the schematic, for a comparison between the schematic and the corresponding layout to determine whether the layout and the schematic match.

Some embodiments described herein maintain and preserve connectivity and/or hierarchy information of the original design with respect to at least the aforementioned parameters and parameterized cell or pcell submaster(s) so that no modifications are need for existing tools (e.g., an LVS check or verification tool) to perform their respective functions in an electronic design flow. This is unlike conventional approaches that attempt to patch the deficiencies in their inability to switch among cells and/or libraries in a view of the electronic design to sweep across similar devices by creating a common cell with a wrapper schematic view for each different cell. A wrapper schematic view comprises a representation of circuit component designs in an electronic design and may be added into an electronic design as an additional layer. The addition and hence the presence of the wrapper schematic view invariably alters the original hierarchical structure of the underlying cell due to the addition of this wrapper schematic view to the original hierarchical structure and also inevitably alters the connectivity due to the addition of this additional wrapper schematic view.

Various embodiments thus allow switching cells and switching libraries based at least in part upon one or more parameters or one or more values therefore in, for example, a parameterized cell or pcell master, a schematic parameterized cell or pcell submaster, or a symbol parameterized cell or pcell submaster. Various embodiments further provide an EDA (Electronic Design Automation) tool with the ability to sweep multiple different yet similar instances in an electronic design with at least two parameterized cell or pcell submasters (e.g., the aforementioned symbol and schematic parameterized cell or pcell submasters) for a group of circuit components (e.g., a cell, a device, a block, a macro, etc.) by using various parameters that have been used or referenced in electronic designs. Some embodiments thus allow the reuse of the same testbench and optionally some common analysis setup for characterization of an electronic design (e.g., in one or more multi-mode, multi-corner analyses).

Unlike some conventional approaches that require manual creation of a wrapper or wrapper cellview for each different cell and hence create one or more additional hierarchies, various embodiments described herein preserve the original hierarchical structure of an electronic design or a portion thereof without creating any additional hierarchies. Moreover, various embodiments utilize entities, parameters, and information that have existed in most, if not all, electronic designs and thus do not require any changes in any infrastructure to achieve various purposes, functionalities, and advantages described herein. In other words, any existing infrastructure of electronic design automation may directly support various embodiments described herein without modifications.

Various embodiments will now be described in detail with reference to the drawings, which are provided as illustrative examples of the invention so as to enable those skilled in the art to practice the invention. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the invention. Further, various embodiments encompass present and future known equivalents to the components referred to herein by way of illustration.

Further, various embodiments encompass present and future known equivalents to the components referred to herein by way of illustration. It shall be noted that various features and techniques are described hereinafter in terms of embodiments and/or examples. Unless otherwise explicitly described as mutually exclusive, any embodiment, example, feature, and/or characteristic described herein may be readily combined in any suitable manner with any other embodiment, example, feature, and/or characteristic, without departing from the scope or spirit of the present disclosures. All such modifications are intended to be within the scope of claims associated with this disclosure.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems have not been shown or described in detail to avoid unnecessarily obscuring descriptions of the embodiments.

In addition, unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 illustrates a high-level block diagram of a simplified system for characterizing an electronic design with efficient cell cloning in one or more embodiments. More specifically, the computing system 100 in FIG. 1 may comprise one or more physical computing systems or virtual machines 100, such as a general-purpose computer described in the System Architecture Overview section to implement one or more special proposes. The illustrative system in FIG. 1 may include an Internet-based computing platform providing a shared pool of configurable computer processing resources (e.g., computer networks, servers, storage, applications, services, a cloud environment, etc.) and data to other computers and devices in a ubiquitous, on-demand basis via the Internet. For example, one or more computing resources and/or modules illustrated in FIG. 1 may be located in a cloud computing platform where computing resources (e.g., storage resources, compute resources, etc.) are provided on an on-demand basis without direct active management by users in some embodiments.

In this system illustrated in FIG. 1, one or more computing systems 100 may invoke and execute various modules to identify a first input 102 (e.g., one or more parameter values of a parameter shared among multiple similar cell instances in an electronic design, etc.), a second input 102 (e.g., a symbol parameterized cell), and a third input 104 (e.g., a schematic parameterized cell) to characterize the underlying electronic design with efficient cloning at least by sweeping across one or more parameter values for the parameter to characterize multiple similar cell instances of a single cell in the electronic design by using a reusable test bench with a single view of the electronic design.

For example, various techniques described herein instantiate a specific cell instance by passing one or more parameter values into a symbol parameterized cell or symbol pcell as well as a schematic parameterized cell or schematic pcell to instantiate the specific cell instance. Although the specific cell instance represents a single cell instance in the electronic design, an analysis engine may sweep across multiple parameter values of a single parameter for multiple similar cell instances, which are not required to be separately created in the electronic design, and characterize each of the multiple similar cell instances or the electronic design with each of the multiple similar cell instances each corresponding to its symbol 150 and schematic design 154 to generate a correlated analysis result 154 including a respective electrical characteristic (e.g., edge rise time) for each of the multiple similar cell instance that are different from each other in a single testbench showing one design view of the underlying electronic design.

The one or more computing systems 100 may invoke and execute a plurality of modules 152, which are specifically programmed and stored at least partially in memory of and functions in conjunction with at least one microprocessor (e.g., a central computing unit, a virtualized microprocessor, etc. 192) or processor core of the one or more computing systems 100, to perform various functions to determine a merged view 150 (e.g., a merged netlist, a merged view from multiple views) and a reduced physical design 153 that may be further provided to an analysis module 120 (e.g., a transient analysis module) to generate the correlated analysis result 154 by sweeping (e.g., by a sweeping module or engine 122) across multiple parameter values of a parameter that respectively correspond to respective circuit symbols 150 and/or respective schematic content 153.

The first input 103, the optional second input 102, and the third input 104 may be provided to one or more modules in the plurality of modules 152 which may further execute one or more tasks for implementing the electronic design or the portion thereof with efficient cloning. For example, an analysis module or engine 120 may perform a transient analysis to characterize the edge rising behavior, edge falling behavior, or other transient behaviors for the first input 103, the second input 102, and the third input 104 for the electronic design or a portion thereof.

Some embodiments described herein may clone multiple similar (yet different) cell instance by using a master parameterized cell that comprises a schematic parameterized cell and a symbol parameterized cell. As a result, a symbol parameterization module or engine 110 and a schematic parameterization module or engine 124 may be utilized to respectively determine the symbol parameterized cell and the schematic parameterized cell and to determine specific symbol parameterized cell instance and the schematic parameterized cell instance once a corresponding parameter value is passed into the respective symbol parameterized cell or symbol pcell or the schematic parameterized cell or schematic pcell. It shall be noted that the term "parameterized cell" and "pcell" may be used interchangeably throughout this disclosure and comprises a master cell having at least one parameter into which different parameter values may be passed to produce cell instances having different appearances, functions, and/or design data.

Some embodiments determine a symbol or a schematic parameterized cell by performing a flattening process that may or may not necessarily capture the relevant data or information. A relevant content module or engine 114 may thus identify the relevant data or information and add the relevant data or information into the parameterized cell (e.g., a symbol parameterized cell or a schematic parameterized cell).

With the first input 103, the second input 102, and the third input 104, the one or more computing systems 100 may execute a similarity module 112 to identify, categorize, classify, or otherwise group multiple cell instances as a set of similar cell instances. It shall be noted the term "cell" is used herein to generally refer to a set of circuit component designs and may include, for example, a macro, an IP (intellectual property) block, a device, or any grouping of circuit component designs, etc. For example, a similarity module 112 may determine multiple different cell instances as similar cell instances when these multiple cell instances share a common characteristic (e.g., the same pin names, the same pinout, or the same pin locations, etc.) As another example, a similarity module 112 may determine multiple different cell instances as similar cell instances when these multiple cell instances are instantiated from the same master cell with identical parameter values, different parameter values, or combinations of identical and different parameter values (e.g., the values for a first parameter being identical, whereas the values for a second parameter not being entirely identical).

The set of modules 152 may also include one or more physical design modules such as a layout editor for editing a layout, a floor planning tool for generating floorplan(s) for an electronic design, a placement tool for placing circuit component designs into a layout, a routing tool for interconnecting circuit component designs placed by the placement tool or floorplanning tool, a physical verification tool (e.g., a DRC or design rule check tool, an LVS or layout versus schematic tool, an XOR or exclusive tool, an antenna check tool, an ERC or electrical rule check tool, etc.) for ensuring correct electrical and logical functionality and manufacturability, a logic synthesis tool, a clock inserting tool for clock wiring, a post-layout optimization tool for ensuring, for example, performance, noise, signal integrity, and/or yield meets the requirements, a DFM (design for manufacturability) tool to ensure manufacturability of an electronic design by, for example, inserting redundant and/or dummy via(s) and/or metal, diffusion, and/or polysilicon layer(s), an error checking tool for ensuring the mapping to logic is performed correctly, a tapeout and mask generation tool for transforming design data into mask data for photomasks, any other tools pertaining to the physical abstraction of an electronic design, or any combinations thereof. In some embodiments, one or more of these physical design modules may be included as one or more corresponding general computing resources in 128.

The set of modules 152 may include or at least function in conjunction with a microprocessor 192 (e.g., a central processing unit or CPU) via a system bus 194 to access or invoke various modules in 152 in some embodiments. In these embodiments, a single microprocessor 192 may be included in and thus shared among more than one module even when the computing system 100 includes only one microprocessor 192. A microprocessor 192 may further access some non-transitory memory 198 (e.g., random access memory or RAM) via a data bus 196 to read and/or write data during the microprocessor's execution of processes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise, for example, a floorplanner, a global routing engine, and/or a detail routing engine 164, a layout editor 166, a design rule checker 168, a verification engine 170, etc.

These various resources 128 may further include, for example, one or more other EDA (electronic design automation) modules such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design.

For example, these various resources 128 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

Strictly as an example, the one or more signoff modules may individually or in conjunction with one or more other modules (e.g., an analysis module 120, a relevant content module 114, a schematic parameterization module 124, a symbol parameterization module 110, etc.) perform various closure tasks to ensure an electronic design meets, for example, power, performance, or any other requirements before tapeout. The one or more signoff modules may include one or more signoff parasitic extraction modules to provide silicon-accurate interconnect parasitic extraction and ensure first-pass silicon success, and one or more power signoff modules to perform various power integrity analyses, transistor-level electro-migration and IR-drop analyses, or other power and signal integrity analyses with SPICE-level accuracy or better accuracy with SPICE or SPICE-like simulations (e.g., FastSPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), electrical rule checks (ERC), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

Once sign-off and/or design closure is achieved, the electronic design is finalized for tapeout; and the electronic design is transmitted to mask fabrication equipment for mask preparation and mask writing to produce photomasks that are then used in the actual manufacturing of the electronic circuits represented by the electronic design.

The one or more computing systems 100 may further write to and read from a local or remote (e.g., networked storage device(s), virtualized storage resource(s), etc.) non-transitory computer accessible storage 162 that stores thereupon data or information such as, but not limited to, one or more databases (174) such as schematic design database(s) or physical design database(s), electronic circuit design specification database(s), techfiles (or technology files) for multiple manufacturing processes for fabricating an underlying electronic design, various statistics, various data, rule decks, various design rules, constraints, etc. (172), or other pertinent information or data (176) that may be used to facilitate the performance of various functions described herein.

In some embodiments, the computing system 100 may include the various resources 128 such that these various resources may be invoked from within the computing system via a network or a computer bus 190 (e.g., an internet session, an intranet session, a data bus 196 interfacing a physical or virtual microprocessor 192 and the non-transitory computer accessible storage medium 198 (e.g., memory) or a system bus 194 between a microprocessor 192 and one or more engines or modules in the various resources 128). In some other embodiments, some or all of these various resources may be located remotely from the computing system 100 such that the computing system may access the some or all of these resources via a computer bus 190 and one or more network components.

In some embodiments, the computing system 100 may include the various resources 128 such that these various resources may be invoked from within the computing system via a system bus 194 (e.g., a data bus interfacing a microprocessor 192 and the non-transitory computer accessible storage medium 198 or a computer bus 190 between a microprocessor 192 and one or more engines in the various resources 128). In some other embodiments, some or all of these various resources may be located remotely from the computing system 100 such that a computing system 100 may access the some or all of these resources via a computer bus and/or one or more network components.

Each of various modules and engines described herein may be implemented as a pure hardware implementation (e.g., in the form of firmware, application specific IC, etc.), a pure software implementation, or a combination of hardware and software implementation. In some embodiments where a module is implemented at least partially as a software implementation, the module may be stored at least partially in memory (e.g., in random access memory, instruction cache, etc.) of at least one of these one or more computing systems 100 for execution.

Figure 2:
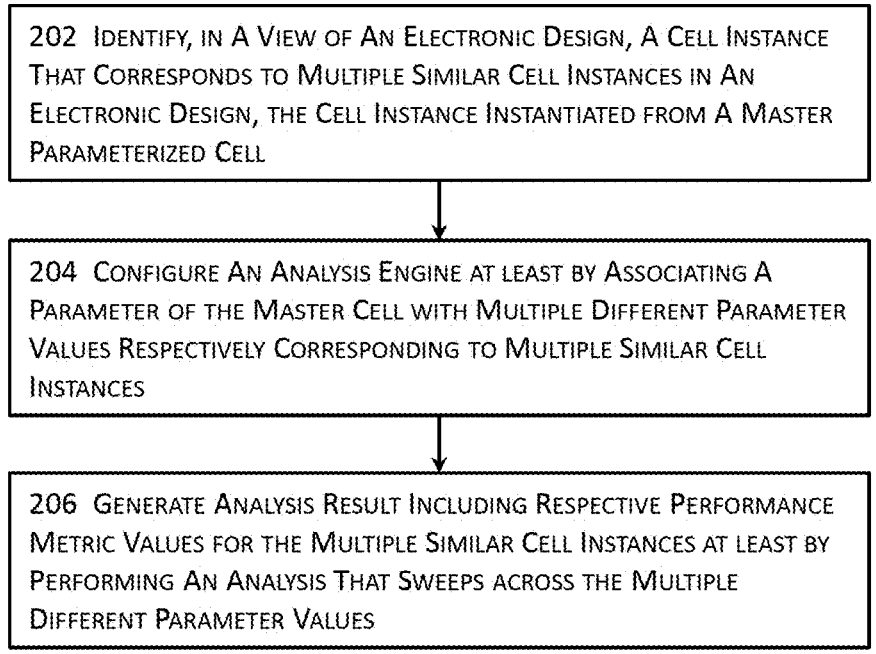
FIG. 2 illustrates a high-level flow diagram for characterizing an electronic design with efficient cell cloning in one or more embodiments.

FIG. 2 illustrates a high-level flow diagram for characterizing an electronic design with efficient cell cloning in one or more embodiments. In these one or more embodiments, a cell instance that corresponds to multiple similar cell instances in a view of an electronic design may be identified at 202. For example, a NAND gate 408A in FIG. 4A or the NAND gate 508A in FIG. 5A may be identified at 202. This NAND gate 408A or 508A is similar to, for example, the OR gate 502C, and AND gate 502H, the NOR gate 502I, and/or the XOR gate 502J when, for example, these gates have the same output pin names and the same input pin names. In some embodiments, the pin locations of each of these similar cell instances may also be the same although it is not required for two similar cells to have identical pin locations. These similar cells may be instantiated or cloned in a view of an electronic design by using a master parameterized cell by using various techniques described herein. It shall be noted the term "cell" is used herein to generally refer to a set of circuit component designs and may include, for example, a macro, an IP (intellectual property) block, a device, or any grouping of circuit component designs, etc.

In some embodiments, two cell instances may be deemed similar when these two cell instances share an identical attribute or characteristic. For example, two different cell instances having the same pin identifications (e.g., pin names), the same pin locations, or the same pinouts, etc. may be deemed similar. Some practical examples of two similar cell instances include two cells (e.g., two operation amplifiers) having different specifications (e.g., not entirely identical) but using the same macro model or schematic, two cells having different drive strengths, etc.

In these one or more embodiments, the cell instance is instantiated from a master parameterized cell by passing one or more parameter values respectively corresponding to one or more parameters of the master parameterized cell where different parameter values for a parameter result in the instantiation of different cell instances (e.g., different appearances, different functions, and/or different design data, etc.) Some examples of these one or more parameters include a library parameter, a cell parameter, a symbol view parameter, and/or a schematic view parameter, or any other appropriate, desired, or required parameters, or any combinations thereof. More details about the one or more parameters are described below with reference to FIG. 3A.

With the master parameterized cell and the one or more parameter values respectively corresponding to one or more parameters of the master parameterized cell, an analysis engine (e.g., 120 in FIG. 1) may be configured with the one or more parameter values at 204. In some embodiments, an analysis engine may be configured by associating a parameter of the master parameterized cell with multiple parameter values that respectively correspond to the multiple similar cell instances in the view of the electronic design. For example, a cell parameter may correspond to multiple parameter values of "AND," "NAND," "OR," "NOR," and "XOR". When these multiple parameter values are passed into a master parameterized cell for the cell parameter, an AND gate, a NAND gate, an OR gate, a NOR gate, and a XOR gate are respectively created.

One of the benefits of various techniques described herein is that for a single instance (e.g., 508A) in a view of an electronic design, various techniques described herein enable an analysis engine to sweep across multiple parameter values of a parameter (e.g., a cell parameter, a library parameter, etc.) of a single cell instance to allow the analysis engine to determine (e.g., by simulation or other analyses) one or more electrical characteristics (e.g., an edge rising time, an edge falling time, etc.) for the single instance in a testbench for the view without having to create a separate view for each of the instances corresponding to the respective parameter values. Instead, the analysis engine merely sweeps across these multiple parameter values and may thus characterize the underlying electronic design with multiple configurations (e.g., different cell instances corresponding to these multiple parameter values) in a single testbench. The testbench, the view, etc. may thus be reused for the same or other different electronic designs subsequently.

An analysis result may thus be generated at 206 at least by performing an analysis that sweeps across the multiple different parameter values in a single testbench for a single view. For example, a user may exploit multiple similar cell instances having respective drive strengths by cloning these multiple similar cell instances with a master parameterized cell having a cell parameter. The cell parameter may correspond to multiple cell parameter values each indicating a respective drive strength. With the techniques described herein, a single testbench for a cell instance in a view of the electronic design (or a portion thereof) may be utilized, and an analysis engine may sweep across these multiple cell parameter values and compute a respective electrical characteristic for each of the multiple cell parameter values swept.

Figure 3A:
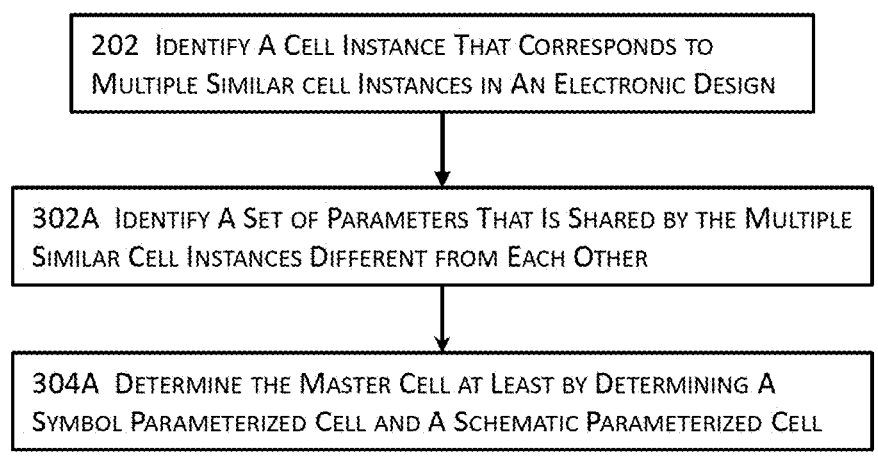
FIG. 3A illustrates a more detailed flow diagram for part of the high-level flow diagram illustrated in FIG. 2 in one or more embodiments.

FIG. 3A illustrates a more detailed flow diagram for part of the high-level flow diagram illustrated in FIG. 2 in one or more embodiments. More particularly, FIG. 3A illustrates more details about identifying a cell instance at 202 of FIG. 2. In some embodiments, identifying the cell instance that corresponds to the multiple similar cell instances includes identifying a set of parameters that is shared by the multiple similar cell instances at 302A. The set of parameters may include, for example, one or more of a library parameter, a cell parameter, a symbol view parameter, and/or a schematic view parameter, or any other appropriate, desired, or required parameters, or any combinations thereof.

A library parameter receives a library parameter value indicating the library from which the symbol and/or the schematic design data of a cell instance is obtained. A cell parameter receives a cell parameter value indicating the cell or the master from which the symbol and/or the schematic design data of a cell instance is obtained. A symbol view parameter receives a symbol view parameter value indicating a graphic representation to use for a cell instance that is instantiated or cloned from a master parameterized cell. A schematic view parameter receives a schematic view parameter value indicating the schematic data for a cell instance that is instantiated or cloned from a master parameterized cell.

Identifying the cell instance that corresponds to the multiple similar cell instances may further include determining, at 304A, the master parameterized cell that receives a set of parameter values each of which corresponds to a parameter in the set of parameters identified at 302A for the instantiation of a specific cell instance of the multiple similar cell instances. A master parameterized cell may be determined by, for example, determining a symbol parameterized cell and a schematic parameterized cell for the master parameterized cell. A symbol parameterized cell, when receiving a specific parameter value (e.g., a cell parameter value or a symbol view parameter value), may be used to instantiate or clone a graphical representation (e.g., a schematic symbol) for a specific cell instance corresponding to the specific parameter value. More details about determining a symbol parameterized cell are described below with reference to FIG. 3B.

A schematic parameterized cell, when receiving a particular parameter value (e.g., a cell parameter value or a schematic view parameter value), may be used to instantiate or clone a specific schematic instance (e.g., a schematic symbol) with corresponding to specific schematic design data for the particular parameter value passed into the schematic parameterized cell. More details about determining a schematic parameterized cell are described below with reference to FIGS. 3C-3E.

Figure 3B:
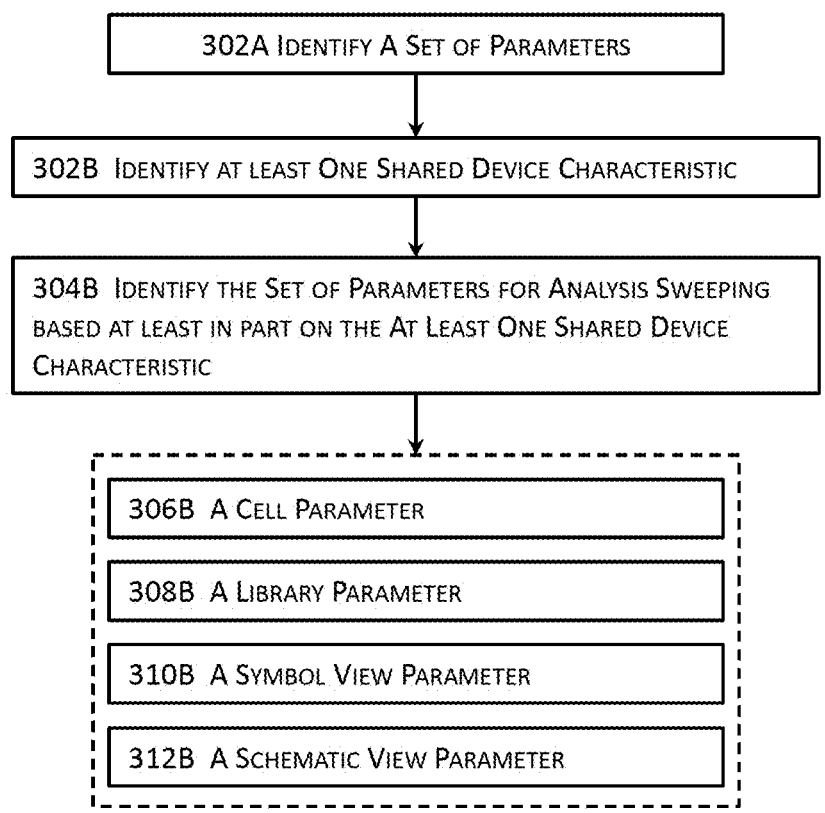
FIG. 3B illustrates a more detailed flow diagram for part of the high-level flow diagram illustrated in FIG. 3A in one or more embodiments.

FIG. 3B illustrates a more detailed flow diagram for part of the high-level flow diagram illustrated in FIG. 3A in one or more embodiments. More specifically, FIG. 3B illustrates more details about identifying a set of parameters shared among multiple similar cell instances at 302A of FIG. 3A. In these embodiments illustrated in FIG. 3B, at least one shared device characteristic that is common or shared among the multiple similar cell instances may be identified at 302B. The set of parameters may then be identified at 304B for analysis sweeping across multiple parameter values of a parameter based at least in part upon the at least one shared or common device characteristic.

For example, a system or process described herein may identify multiple cell instances that are instantiated or cloned from the same master parameterized cell as the aforementioned multiple similar cell instances. In this example, the common master parameterized cell among these multiple similar cell instances may be considered as the aforementioned at least one shared device characteristic.

As another example, a process or system described herein may identify a plurality of cell instances each of which includes the same pin configuration that comprises the information such as a number of pins and the name of each of the number of pins. In this example, the same pin configuration may be considered as the aforementioned at least one shared device characteristic. In these embodiments, two cell instances may be considered similar when these two cell instances have the same number of pins with the same pin name(s). In addition or in the alternative, the pin configuration may include pin locations in some embodiments. For example, two cells having the same pin locations may also be considered similar.

As described above, the set of parameters may include, for example, at least one of a library parameter (306B), a cell parameter (308B), a symbol view parameter (310B), or a schematic view parameter (312B), etc., each of which may receive a respective value that may be used to define or control one or more characteristics (e.g., the appearance or graphical representation, the schematic design data, the function, the library referenced, or the type of the cell instance, etc.) of a cell instance instantiated therefrom. Different parameter values of the same parameter, when passed into the master parameterized cell, may thus result in different cell instances.

During design characterization, an analysis engine may thus sweep across multiple parameter values of a parameter for a cell instance in a single design view to determine or compute respective electrical characteristics that respectively correspond to these multiple parameter values, without having to create a separate design view for each separate cell instance. As a result, various techniques described herein enable switching among multiple types of similar cell instances and/or among multiple different libraries from within a single design view (or with multiple design views in some of these embodiments) in a testbench so that the single design view and/or the testbench may be reused for various subsequent analyses (e.g., the same analysis or one or more different analyses).

Figure 3C:
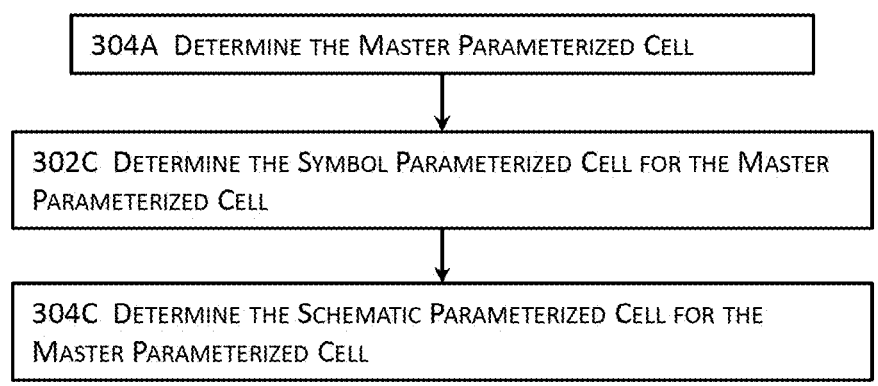
FIG. 3C illustrates a more detailed flow diagram for part of the high-level flow diagram illustrated in FIG. 3A in one or more embodiments.

FIG. 3C illustrates a more detailed flow diagram for part of the high-level flow diagram illustrated in FIG. 3A in one or more embodiments. More specifically, FIG. 3C illustrates more details about determining the master parameterized cell at 304A of FIG. 3A. Various techniques described herein employ two parameterized cells for a master parameterized cell—a symbol parameterized cell and a schematic parameterized cell—to enable switching among multiple types of similar cell instances and/or among multiple different libraries with a single design view.

At 302C, a symbol parameterized cell may be determined for the master parameterized cell. When a symbol parameter value is passed into a symbol parameterized cell, the process or system described herein may use the symbol parameter value to determine the corresponding graphical representation (e.g., schematic symbol) for the corresponding cell instance. More details about determining a symbol parameterized cell is described below with reference to FIG. 3D.

A schematic parameterized cell may be further determined at 304B. More details about determining a schematic parameterized cell is described below with reference to FIG. 3D. When a schematic parameter value is passed into a schematic parameterized cell, the process or system described herein may use the schematic parameter value to determine the corresponding design data (e.g., schematic symbol) for the corresponding cell instance. More details about determining a schematic parameterized cell is described below with reference to FIG. 3E.

Figure 3D:
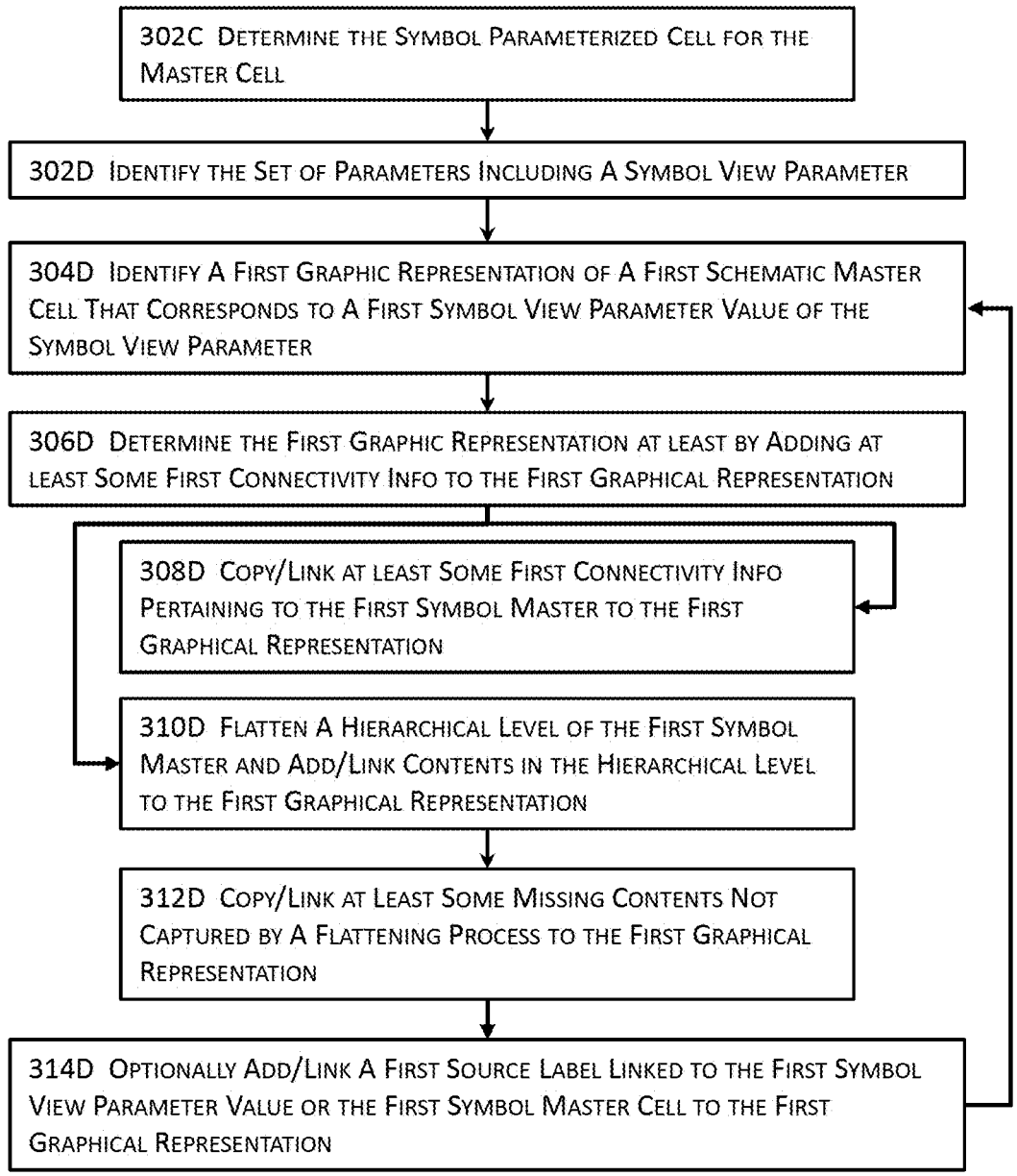
FIG. 3D illustrates a more detailed flow diagram for part of the high-level flow diagram illustrated in FIG. 3C in one or more embodiments.

FIG. 3D illustrates a more detailed flow diagram for part of the high-level flow diagram illustrated in FIG. 3C in one or more embodiments. More specifically, FIG. 3D illustrates more details about determining a symbol parameterized cell in some embodiments. It shall be noted that for a master parameterized cell, the corresponding symbol parameterized cell and/or the corresponding schematic parameterized cell may be determined anew (e.g., from scratch) or may be identified from one or more preexisting or previously determined parameterized cells.

At 302D, the set of parameters that includes a symbol view parameter may be identified. A value for a symbol view parameter indicates a graphic representation (e.g., a schematic symbol) to use for a cell instance that is instantiated or cloned from a master parameterized cell with the value. A first graphical representation of a first schematic master cell (e.g., a conventional, existing first schematic master cell or a first schematic master parameterized cell described herein) may be identified at 304D in some embodiments. The first graphical representation may be identified by using the symbol view parameter value alone or the symbol view parameter value together with one or more other parameter values. In some of these embodiments, the first schematic master cell corresponds to a first symbol view parameter value of the symbol view parameter.

Figure 4A:
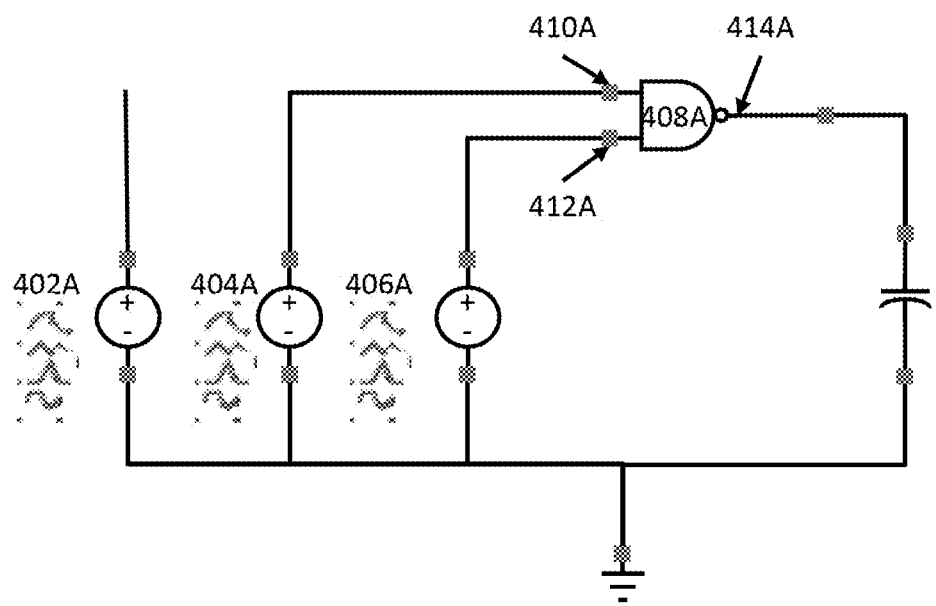
FIG. 4A illustrates a simplified schematic example for characterizing an electronic design with efficient cell cloning in one or more embodiments.
Figure 5A:
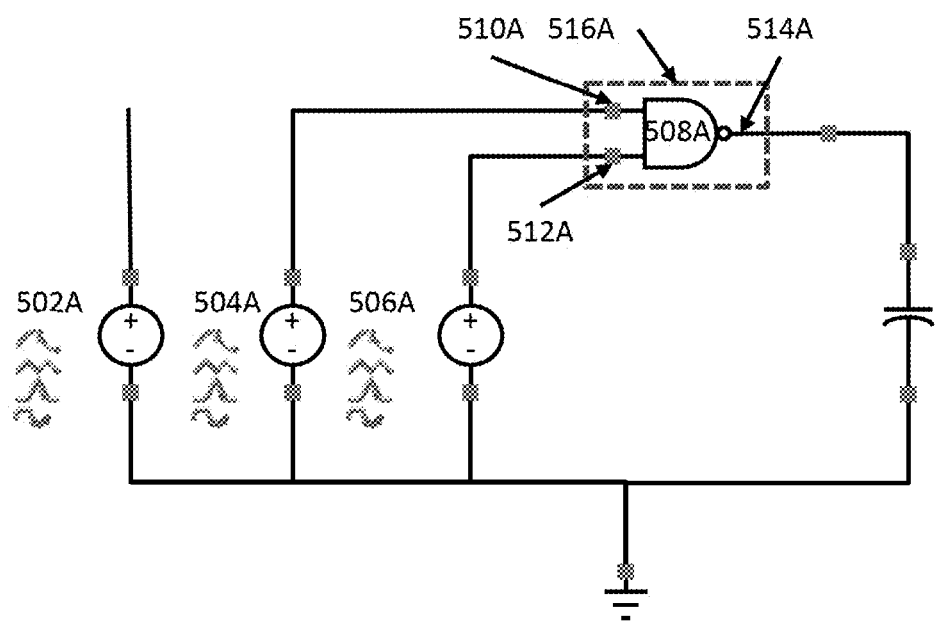
FIGS. 5A-5J illustrate simplified examples of characterizing an electronic design with efficient cell cloning and example user interface manipulations in one or more embodiments.

For example, when a cell parameter value of "NAND" is passed into the master parameterized cell illustrated in FIG. 4A or 5A, a graphical representation of a NAND gate may be identified at 304D. As another example where the master parameterized cell receives a cell parameter value of "XOR" and a symbol view parameter value of "symbol" (e.g., as illustrated in FIG. 5J), an XOR gate symbol (e.g., 502J) may be identified at 304D.

In some embodiments, one or more first pins may be added to the first graphical representation at 306D so that the cell instance, once instantiated, may be properly connected in the electronic design. In some of these embodiments, the first graphical representation may be associated with these one or more first pins so that the respective information of these one or more first pins (e.g., pin names, nets or net segments connected to these one or more pins, and/or the source(s) from which the one or more pins are obtained or determined, etc.) may be optionally displayed or suppressed in the user interface. This respective information may be constructed as an interactive object in some embodiments so that this respective information, when interacted upon by a designer, may invoke, for example, a display of the source(s) from which the one or more pins or the information thereof is obtained or determined.

The one or more pins may be added or linked to the first graphical representation in many different ways. For example, at least some of the first connectivity information pertaining to the first instance instantiated from the first symbol master (e.g., instantiation by passing a symbol view parameter value into the first symbol master) may be copied or linked to the first graphical representation at 308D in some embodiments. In some other embodiments, one or more hierarchical levels of the first instance instantiated from the first symbol master (from which the first graphical representation is identified) may be flattened at 310D, and at least some of the contents (e.g., the aforementioned one or more pins and other desired or required information or data) of the one or more flattened hierarchical levels may be added or linked to the first graphical representation. A symbol master may include a parameterized construct that is parameterized with one or more parameters (e.g., a symbol view parameter) and may be used to instantiate a graphical representation for the set of electronic component designs represented by, for example, passing a symbol view parameter value into the symbol master.

In some of these embodiments, a flattening process used in flattening the one or more hierarchical levels may or may not necessarily capture all the desired or required information or data into the one or more flattened hierarchical. For example, a special layer that includes a rectangular area on or around an instance for selecting the instance when clicked upon may not be captured by a flattening process because such a special layer is not a part of the hierarchical design of the instance. In these embodiments, at least some of the missing contents that are deemed relevant to subsequent design flow or characterization flow may be recaptured by copying or linking such at least some of the missing contents to the first graphical representation at 312D.

At 314D, a first source label indicative of the source from which the first graphical representation (e.g., the instance instanted from the first symbol master in FIG. 3D) may be identified may be optionally copied or linked to the first graphical representation in some embodiments. This first source label may be configurable to be displayed or suppressed in the user interface.

Figure 3E:
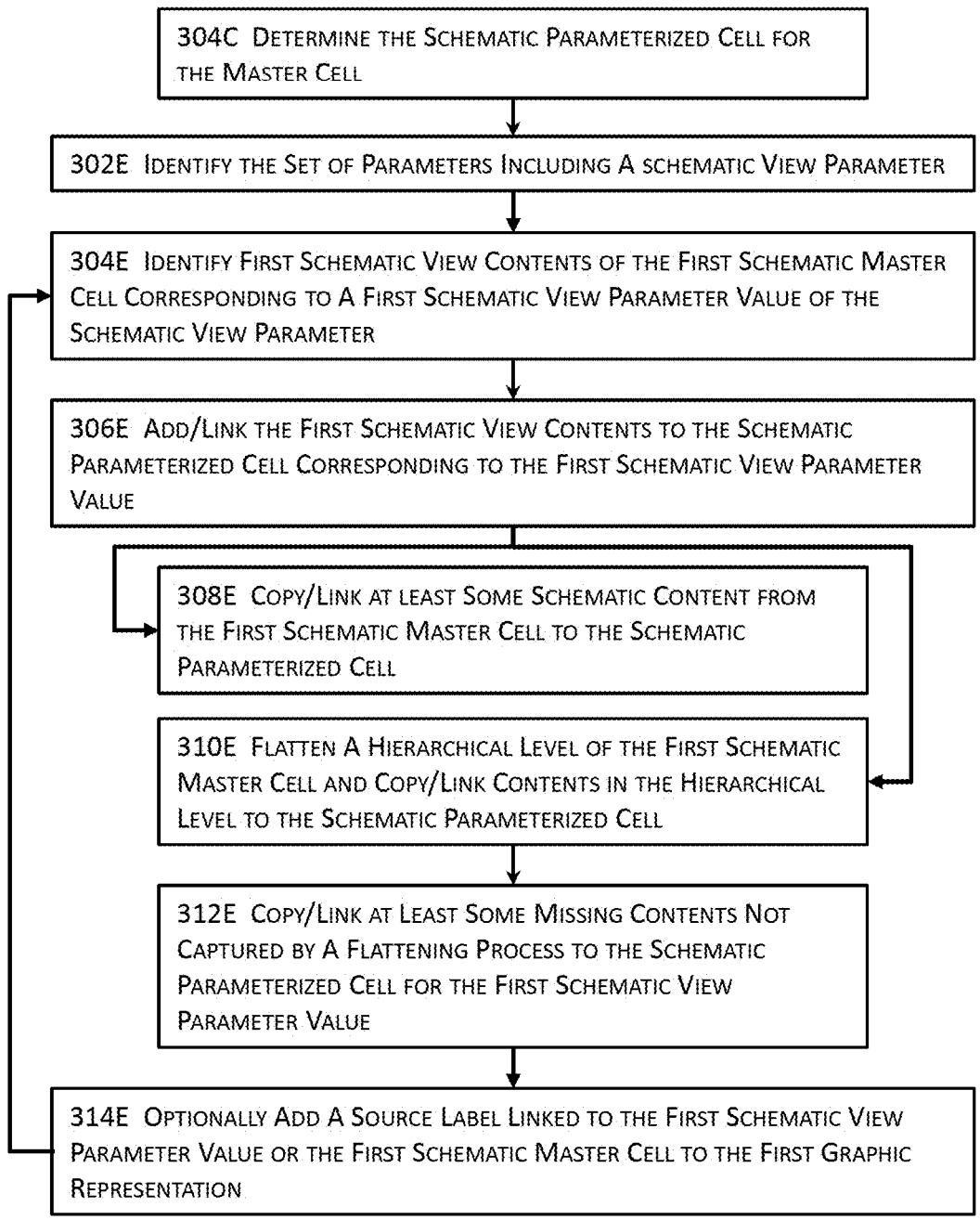
FIG. 3E illustrates a more detailed flow diagram for part of the high-level flow diagram illustrated in FIG. 3C in one or more embodiments.

FIG. 3E illustrates a more detailed flow diagram for part of the high-level flow diagram illustrated in FIG. 3C in one or more embodiments. More specifically, FIG. 3E illustrates more details about determining a schematic parameterized cell in some embodiments. It shall be noted that for a master parameterized cell, the corresponding schematic parameterized cell may be determined anew (e.g., from scratch) or may be identified from one or more preexisting or previously determined parameterized cells.

At 302E, the set of parameters that includes a schematic view parameter may be identified. A value for a schematic view parameter indicates the schematic data to populate into a cell instance that is instantiated or cloned from a master parameterized cell with the value. At least some of the first schematic view contents of the first schematic master cell (e.g., a conventional, existing first schematic master cell or a first schematic master parameterized cell described herein) may be identified at 304E in some embodiments. The first schematic view contents may be identified by using the schematic view parameter value alone or the schematic view parameter value together with one or more other parameter values. In some of these embodiments, the first schematic master cell corresponds to a first schematic view parameter value of the schematic view parameter.

For example, when a cell parameter value of "NAND" is passed into the master parameterized cell illustrated in FIG. 4A or 5A, at least some of the schematic view contents of a NAND gate may be identified at 304E. As another example where the master parameterized cell receives a cell parameter value of "XOR" and a schematic view parameter value of "schematic" (e.g., as illustrated in FIG. 5J), at least some schematic view contents of an XOR gate (e.g., 502J) may be identified at 304E.

In some embodiments, at least some of the first schematic view contents identified at 304E may be added to the schematic parameterized cell at 306E so that a cell instance, once instantiated, includes the desired or required data. The at least some of the first schematic view contents may be added or linked to the schematic parameterized cell in many different ways. For example, the at least some of the first schematic view contents may be copied or linked to the schematic parameterized cell at 308E in some embodiments. In some other embodiments, one or more hierarchical levels of the first schematic master cell (from which the first schematic view contents are identified) may be flattened at 310E, and the at least some of the first schematic view contents of the one or more flattened hierarchical levels may be added or linked to the schematic parameterized cell.

In some of these embodiments, a flattening process used in flattening the one or more hierarchical levels may not necessarily capture all the desired or required information or data in the one or more flattened hierarchical levels. In these embodiments, at least some of the missing contents that are deemed relevant to subsequent design flow or characterization flow may be recaptured by copying or linking such at least some of the missing contents to the schematic parameterized cell at 312E.

At 314E, a first source label indicative of the source from which the first schematic view contents are identified may be optionally copied or linked to the schematic parameterized cell in some embodiments. This first source label may be configurable to be displayed or suppressed in the user interface.

Figure 3F:
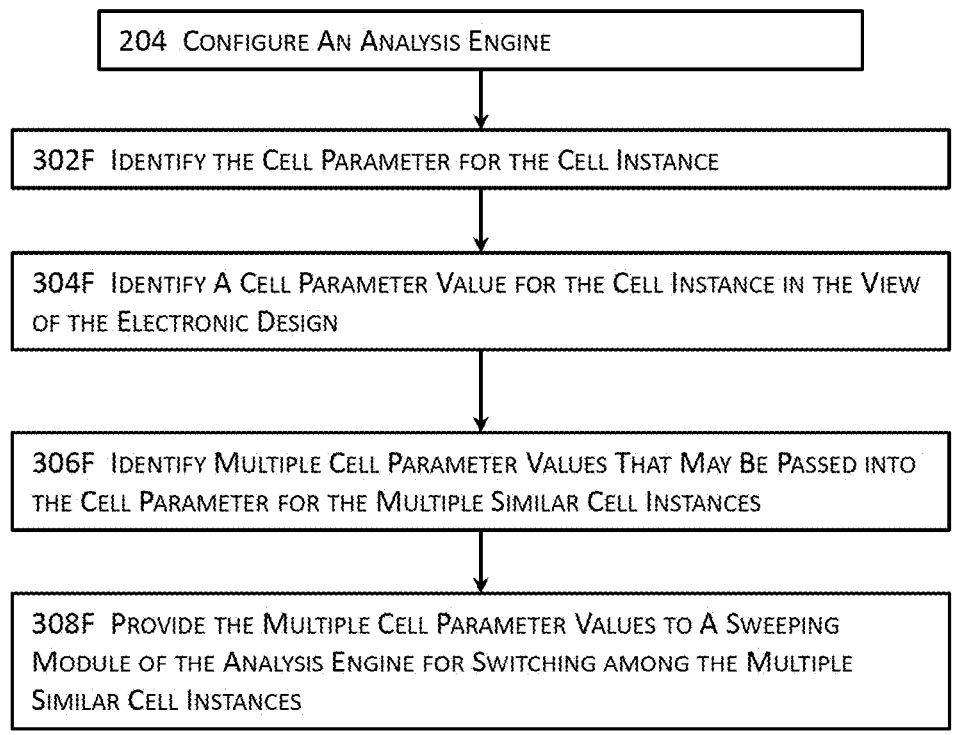
FIG. 3F illustrates a more detailed flow diagram for part of the high-level flow diagram illustrated in FIG. 2 in one or more embodiments.

FIG. 3F illustrates a more detailed flow diagram for part of the high-level flow diagram illustrated in FIG. 2 in one or more embodiments. More specifically, FIG. 3F illustrates more details about configuring an analysis engine at 204 of FIG. 2. In these one or more embodiments, the cell parameter for the cell instance that is to be swept may be identified at 302F. A cell parameter receives a cell parameter value indicating the cell or the master from which the symbol and/or the schematic design data of a cell instance is obtained.

A cell parameter value for the cell parameter may be identified at 304F for the cell instance in the view of the electronic design. For example, the cell parameter value "NAND" may be identified at 304F in the example illustrated in FIG. 5A. As described above, the cell instance is a part of multiple similar cell instances. In the example illustrated in FIGS. 5A-5J, the NAND gate belongs to multiple similar cell instances including other similar cell instances such as an AND gate, an OR gate, an XOR gate, a NOR gate.

Multiple cell parameter values may be identified at 306F. These multiple cell parameter values, when passed into a master parameterized cell, are respectively used to instantiate the multiple similar cell instances. The multiple cell parameter values may then be provided to an analysis engine at 308F for switching among these multiple similar cell instances by sweeping across the multiple cell parameter values.

Figure 3G:
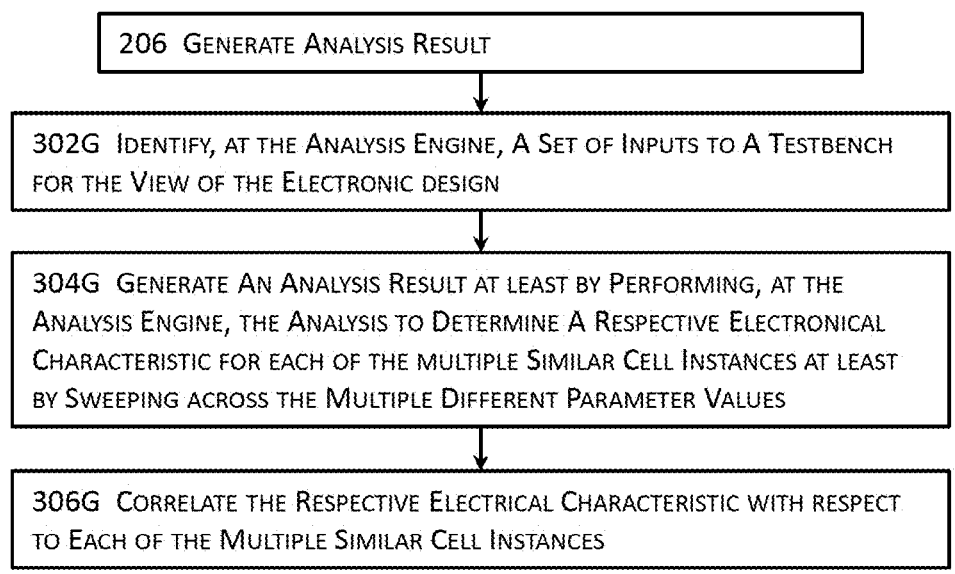
FIG. 3G illustrates a more detailed flow diagram for part of the high-level flow diagram illustrated in FIG. 2 in one or more embodiments.

FIG. 3G illustrates a more detailed flow diagram for part of the high-level flow diagram illustrated in FIG. 2 in one or more embodiments. More specifically, FIG. 3G illustrates more details about generating the analysis result at 206 of FIG. 2. In these one or more embodiments, a set of inputs for the underlying electronic design may be provided to a testbench at 302G for the view of the electronic design. In some embodiments, the set of inputs may include, for example source voltage(s), delay time, rise time, fall time, pulse width, period, analysis type, stop criterion (criteria), accuracy, the view of the electronic design, etc.

As described above, one of the benefits of various techniques described herein is that for a single instance (e.g., 508A in FIG. 5A) in a view of an electronic design, various techniques described herein enable an analysis engine to sweep across multiple parameter values of a parameter (e.g., a cell parameter, a library parameter, etc.) for a single cell instance to allow the analysis engine to determine (e.g., by simulation or other analyses) one or more electrical characteristics (e.g., an edge rising time, an edge falling time, etc.) for the single instance as well as other similar instances each of which may be instantiated in place of the single instance in a testbench for the view without having to create a separate view for each of the similar instances corresponding to the respective parameter values.

Rather, the analysis engine merely sweeps across these multiple parameter values and may thus characterize the underlying electronic design with multiple configurations (e.g., different cell instances corresponding to these multiple parameter values for the aforementioned single cell instance) in a single testbench. The testbench, the view, etc. may thus be reused for the same or other different electronic designs subsequently. This reusability of testbenches and design views not only free up designers or test engineers from having to compose tedious testbenches with different views each including a similar cell instance of the multiple similar cell instances but also conserves the compute time in compiling testbenches and design data as well as the storage space for the testbenches and design views.

An analysis result may be generated at 304G at least by performing the analysis to determine a respective electrical characteristic for each of the multiple cell parameter values by sweeping across the multiple cell parameter values. The respective electrical characteristics corresponding to multiple cell parameter values may be correlated at 306G with each other with respect to each of the multiple similar cells. It shall be noted that although various figures and their respective descriptions described herein refer to a cell parameter for switching among a plurality of cell instances by sweeping across their respective cell parameter values, the same techniques also apply with equal effects to other parameters such as the library parameter, the schematic view parameter, and/or the symbol view parameter described above.

FIG. 4A illustrates a simplified schematic example for characterizing an electronic design with efficient cell cloning in one or more embodiments. This example illustrates a NAND gate 408A having the first input 412A connected to a first voltage source 406A and the second input 410A connected to a second voltage source 404A. The NAND gate 408A combines the inputs 410A and 412A to provide the output 414A. The example illustrated in FIG. 4A further comprises a third voltage source 402A.

Figure 4B:
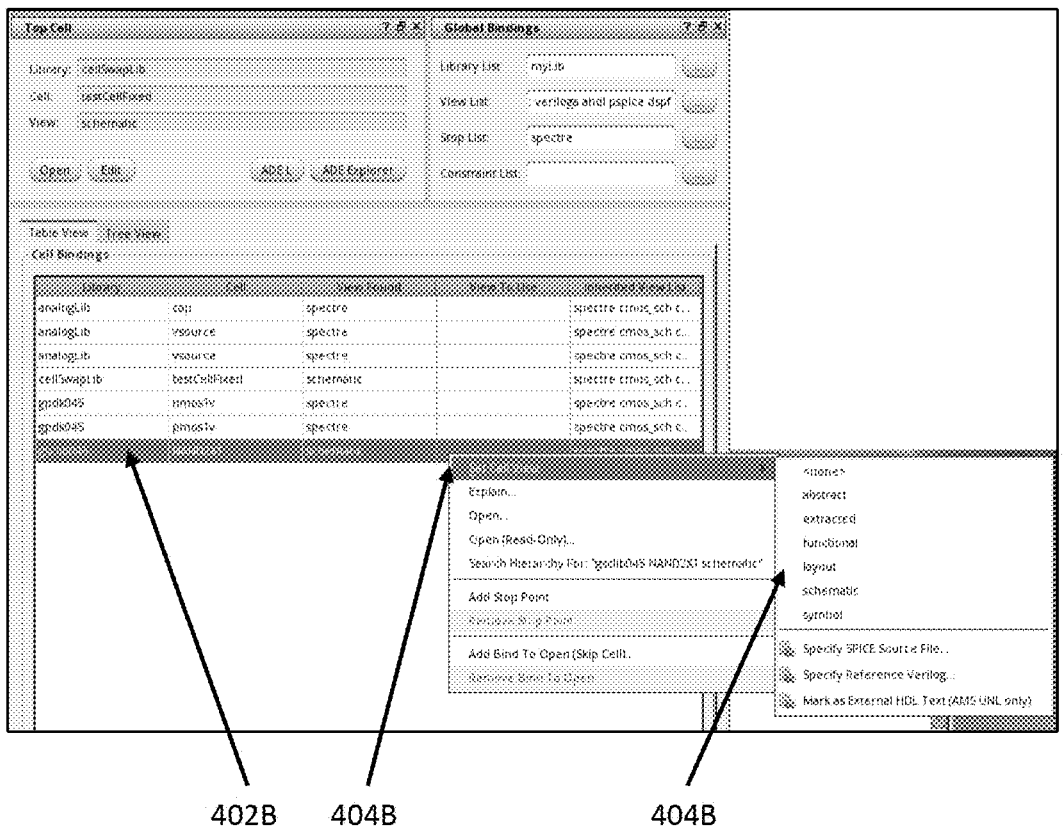
FIG. 4B illustrates an example user interface for characterizing an electronic design by switching cell instances or libraries in one or more embodiments.

FIG. 4B illustrates an example user interface for characterizing an electronic design by switching cell instances or libraries in one or more embodiments. More specifically, FIG. 4B illustrates a portion of a user interface that enables switching among different design views of an electronic design for an analysis performed on the electronic design. To switch from one view to another view, a designer may select a view 402B from a browser, right click on the selected view to bring up a context menu, and select "select view" (404B) in the context menu to bring up the submenu 404B that provides several options for a user to switch from one design view (or simply "view") to another design view. Conventional approaches do not provide the capability to switch among different yet similar cells or different libraries. Instead, conventional approaches require a user to create a separate view for each of a plurality of similar yet different views for a testbench. When the testbench is compiled for the electronic design, the separate view and the corresponding library may also be compiled.

FIG. 5A illustrates a portion of a simplified electronic design to which various techniques described may be applied to characterize the simplified electronic design in one or more embodiments. This example illustrates that an instance (508A) of a "CellSwap" component with a cell parameter value of "NAND" provided with the techniques described herein. In this example, the cellSwap is instantiated as shown in FIG. 5A as a NAND gate 508A having the first input 512A connected to a first voltage source 506A and the second input 510A connected to a second voltage source 504A. The NAND gate 508A combines the inputs 510A and 512A to provide the output 514A. The example illustrated in FIG. 5A further comprises a third voltage source 502A.

Moreover, the examples illustrated in FIGS. 5A-5J may represent an example scenario where a designer has a set of two-input logic gates (e.g., NAND, NOR, AND, OR, XOR) and would like to determine edge times with different loads across all the library variants in the library. Conventional approaches now require the user to create a wrapper schematic cellview with one cellview for each of the different yet similar cells. In addition to being cumbersome (e.g., an electronic design having tens or hundreds of similar cells), these conventional approaches also waste an unnecessary amount of compute and storage resources. Further the generation of the wrapper schematic cellview also disturbs the original hierarchies of the electronic design and may thus require manual editing or modifications of various expressions in a testbench to point to the correct hierarchies.

Figure 5B:
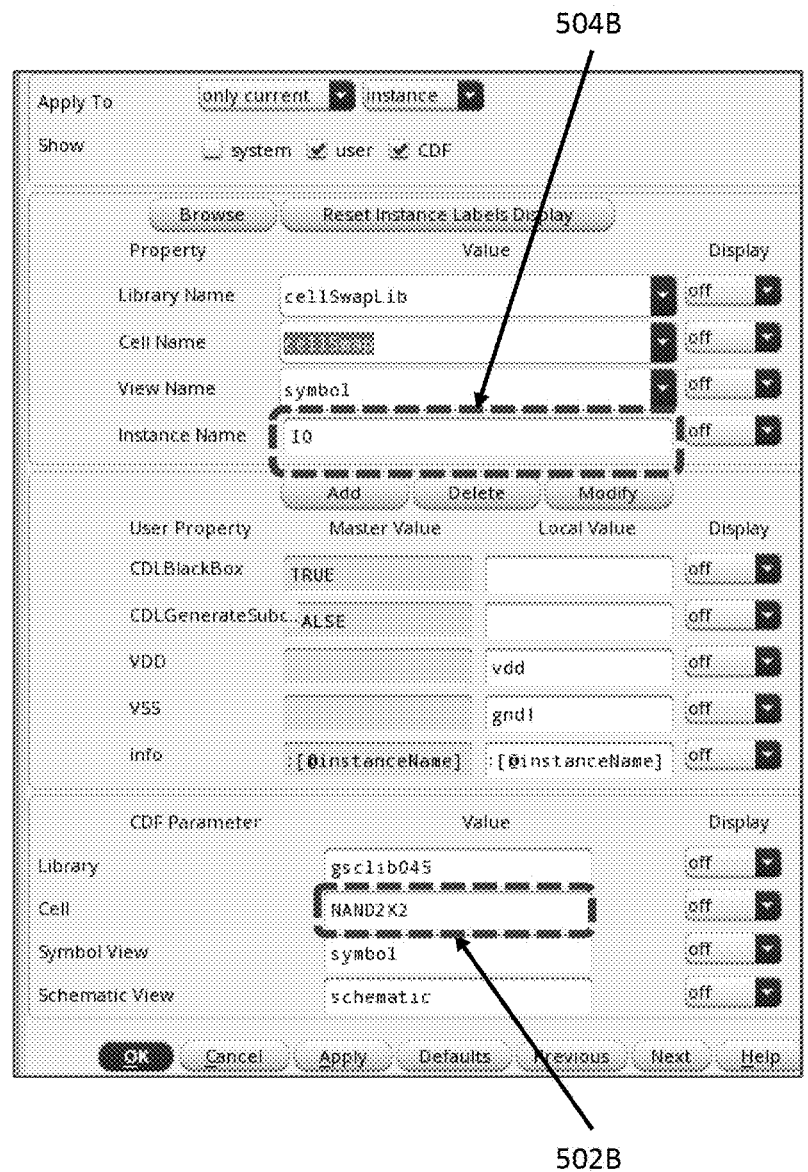

FIG. 5B illustrates a portion of an example user interface to facilitate the application of various techniques described herein for characterizing an electronic design with efficient cell cloning in one or more embodiments. This example user interface illustrates the selection (as graphically indicated by the box 516A) of the instance (508A) of the "CellSwap" component having a cell parameter value "NAND" and instantiated as the NAND gate 508A from the portion of the electronic design illustrated in FIG. 5A. For example, a user may click on the NAND gate 508A in the user interface to select this NAND gate. As described above, the symbol for the NAND gate 508A may include a special layer having a rectangular area. A click within this rectangular area may indicate the selection of the associated device—the NAND gate 508A. it shall be noted that this special layer is usually not captured by a flattening process and may thus constitute part of the aforementioned "missing contents". This NAND gate 508A is instantiated in the portion of the electronic design under the instance name "I0" (504B).

This example user interface in FIG. 5B further illustrates the four parameters (a library parameter, a cell parameter 502B, a symbol view parameter, and a schematic view parameter) as well as their corresponding parameter values. For example, the library parameter corresponds to the library parameter value "gsclib045"; the cell parameter corresponds to the cell parameter value "NAND2X2"; the symbol view parameter corresponds to the symbol view parameter value "symbol"; and the schematic view parameter corresponds to the schematic view parameter value "schematic" for the selected cell instance 508A in FIG. 5A.

Figure 5C:
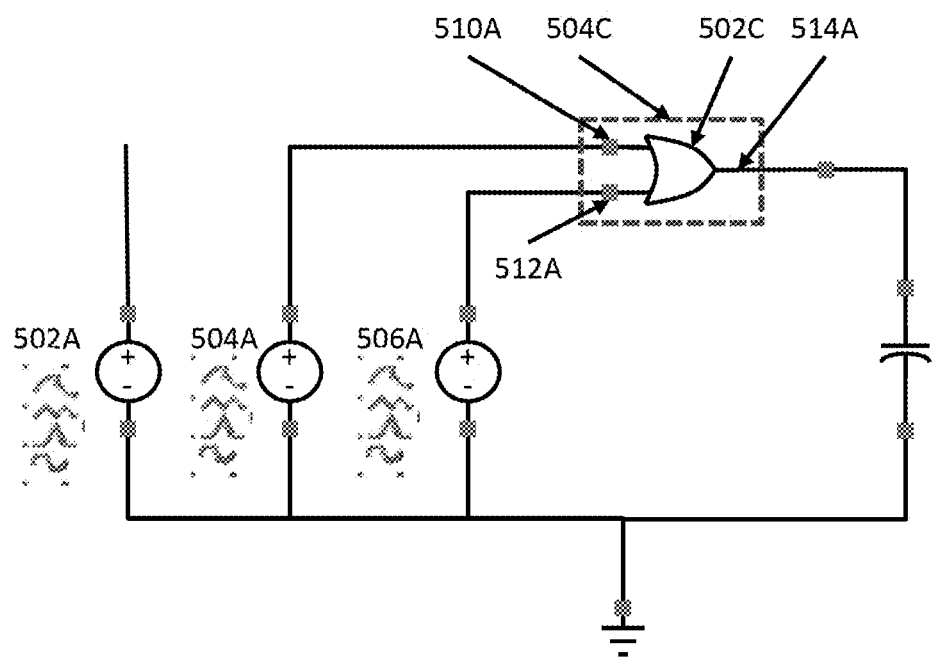

FIG. 5C illustrates the portion of the simplified electronic design to which some techniques described apply for characterizing the simplified electronic design with efficient cloning in one or more embodiments. More particularly, FIG. 5C illustrates another example where the "CellSwap" component having the "OR" cell parameter value is instantiated as a similar yet different two-input device—the OR gate 502C—that may be analyzed in a single testbench for the design view illustrated in FIG. 5A by sweeping multiple parameter values of a parameter (e.g., the cell parameter 502B illustrated in FIG. 5B). It shall be noted that although FIGS. 5A-5J illustrate some examples of cell switching with multiple different cell parameter values, identical or substantially similar techniques may be applied to other parameter values (e.g., multiple library parameter values of a library parameter) to provide the capability for library switching within an analysis. Furthermore, some embodiments may enable both cell switching and library switching by passing respective sets of parameter values into an analysis engine so that the analysis may sweep across each of these parameter values in a single analysis.

Some conventional approaches require a user to create a separate view for each of a plurality of similar (yet different) cell instances and thus waste an unnecessary amount of storage resource in storing these separate views as well compute resource in subsequent processing and analyses. With the techniques described herein, a user no longer needs to generate a separate view for each of the plurality of similar yet different cell instances. Rather, a user may use the example user interface illustrated in FIG. 5E described below to use the sweeping module or engine to sweep across multiple parameter values of a single parameter, without having to generate any additional, separate design views for these multiple parameter values.

Figure 5D:
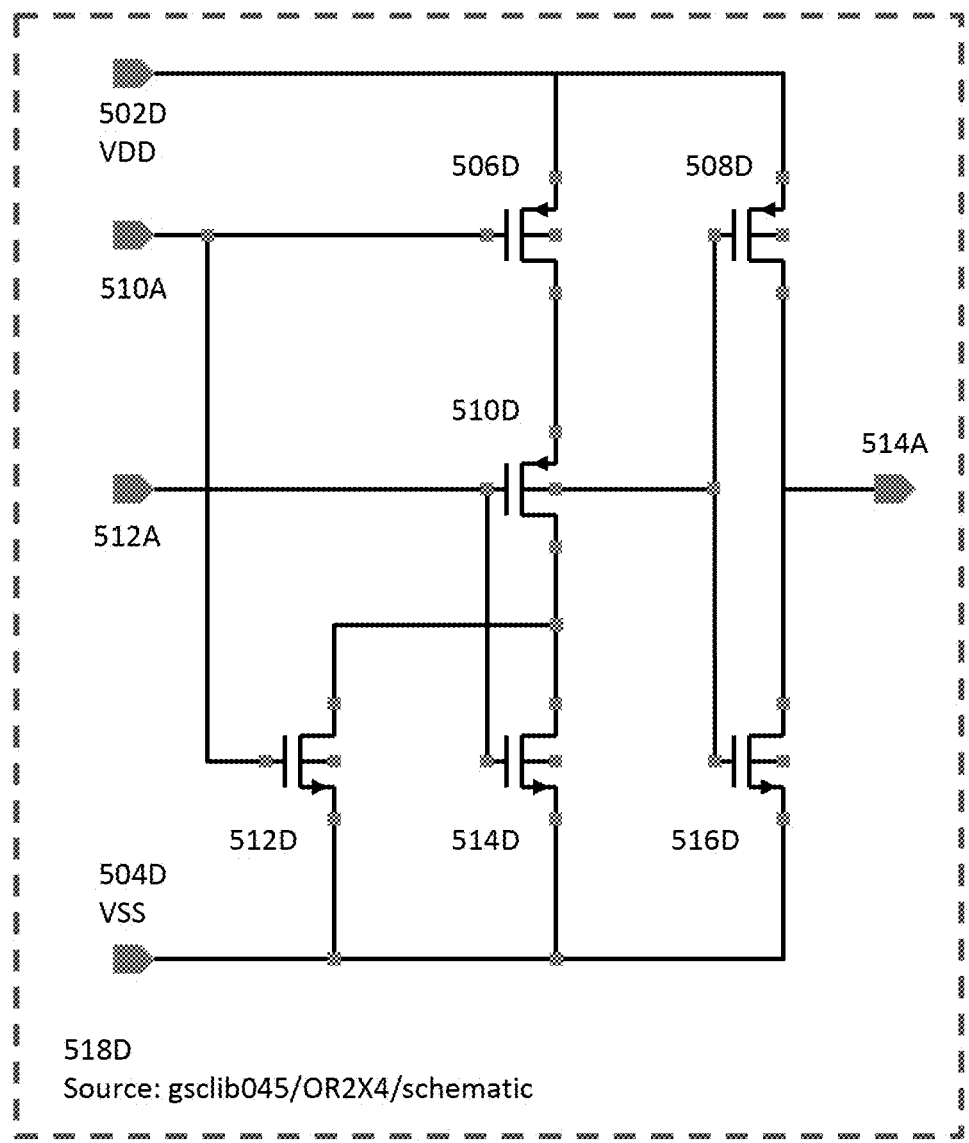

FIG. 5D illustrates an example content of an instance in the simplified electronic design illustrated in FIG. 5C in one or more embodiments. More specifically, FIG. 5D illustrates that other than the use of two parameterized cells (e.g., a symbol parameterized cell and a schematic parameterized cell) for each master parameterized cell, the electronic design so constructed nevertheless is entirely identical to the electronic design generated by other conventional approaches in all the other aspects. For example, a selected cell instance (e.g., the selection of the OR gate 502C as indicated by the dashed rectangular area 504C) may be descended into by one or more hierarchies to reveal the details of the hierarchy descended into as illustrated in FIG. 5D.

In this example illustrated in FIG. 5D, the more detailed design data at the hierarchy descended into includes the same external boundary pins (e.g., 510A and 512A for the two inputs and 514A for the output as shown in both FIG. 5D and FIG. 5A). The more detailed design data further includes the VDD (502D) and the VSS (504D) as well three PMOS's (P-type metal-oxide-semiconductor) 506D, 508D, and 510D and three NMOS's (N-type metal-oxide-semiconductor) 512D, 514D, and 516D. Moreover, the more detailed design data view illustrated in FIG. 5D further illustrates the optional source label 518D that indicates the source from which a particular cell instance is identified.

Figure 5E:
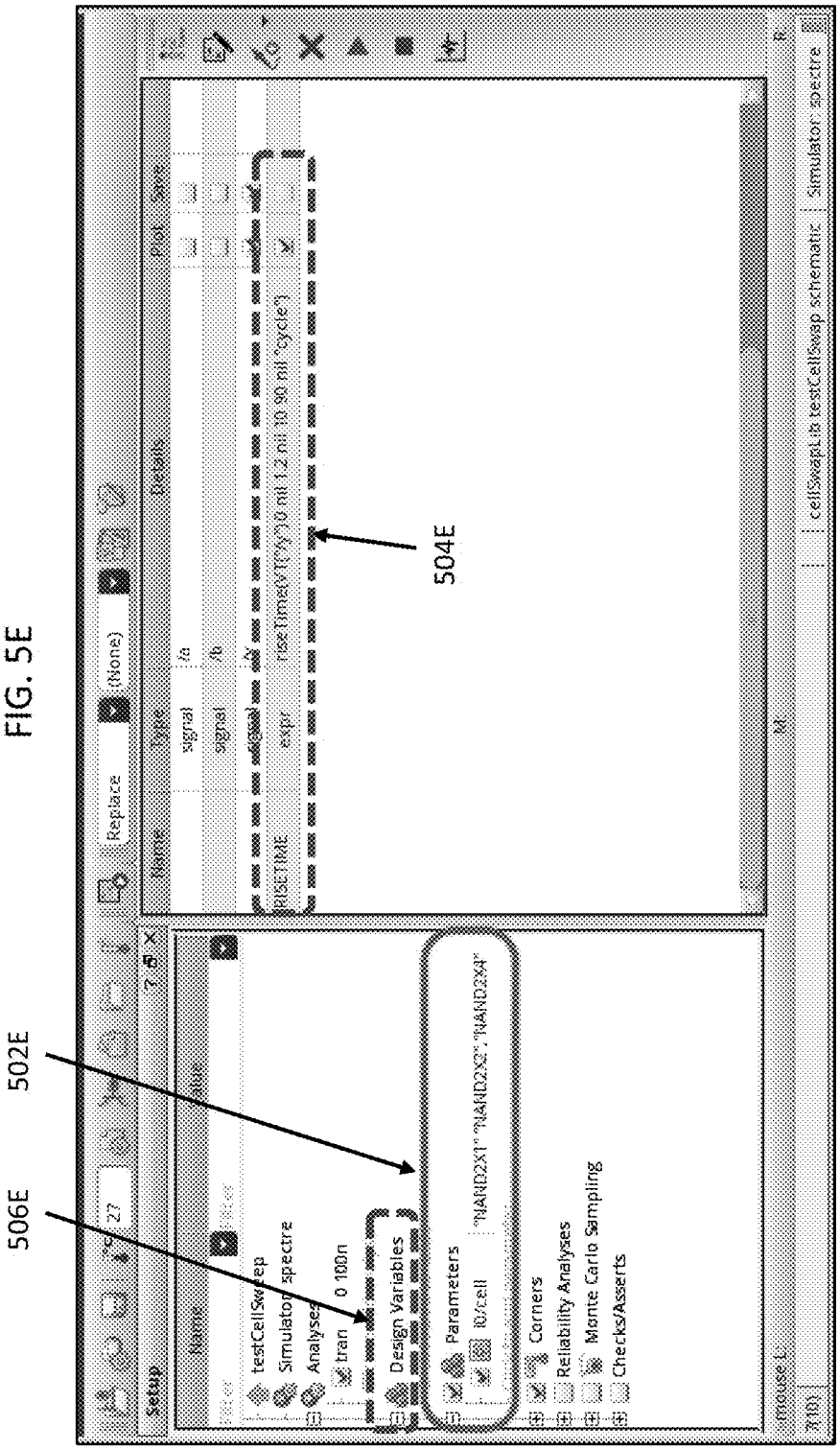

FIG. 5E illustrates another portion of an example user interface of, for example, an analysis engine to facilitate the application of various techniques described herein for characterizing an electronic design with efficient cell cloning in one or more embodiments. More specifically, the example user interface portion illustrated in FIG. 5E shows the that the system described herein or a user may identify multiple parameter values 502E for the parameter is "cell" (e.g., a cell parameter as described herein) for an instance (e.g., the cell instance "I0" as shown in FIG. 5E as well as 504B in FIG. 5B).

502E of FIG. 5E further illustrates that multiple parameter values are passed into the analysis engine so that the analysis engine may sweep across these multiple parameter values for the cell parameter of the cell instance "I0" in its determination of one or more electrical characteristics (e.g., edge rise time in 504E). During parameter value sweeping, the analysis engine overwrites the cell parameter value with each of the multiple cell parameter values (as well as the corresponding design data) for characterizing the underlying electronic design to determine the electrical characteristic (e.g., 504E).

Figure 5F:
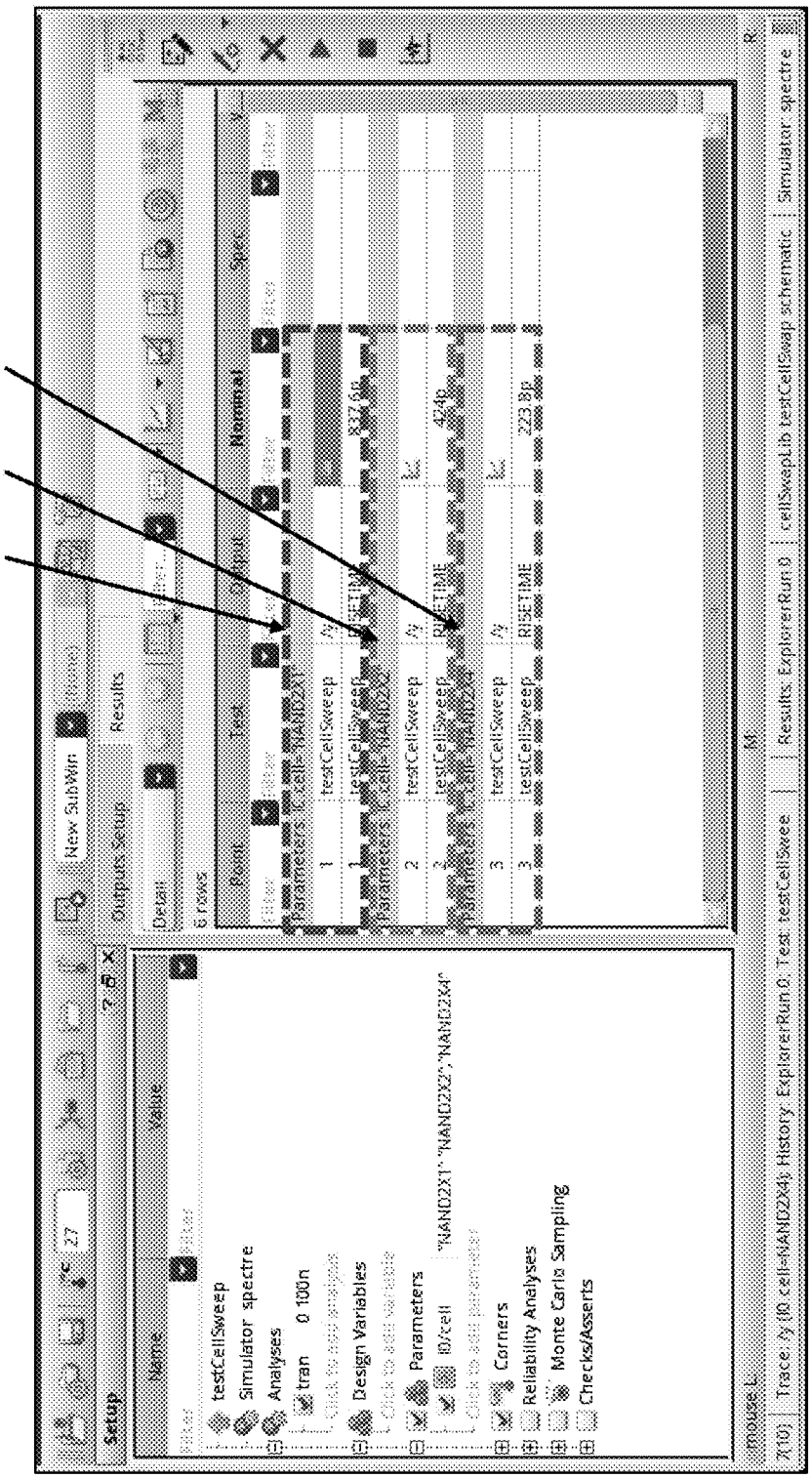

FIG. 5F illustrates a portion of another example user interface showing a result of characterizing an electronic design with efficient cell cloning in one or more embodiments. More particularly, FIG. 5F illustrates the characterization results (e.g., rise time) 502F, 504F, and 506F for each of three cell parameter values that are swept during the characterization.

Figure 5G:
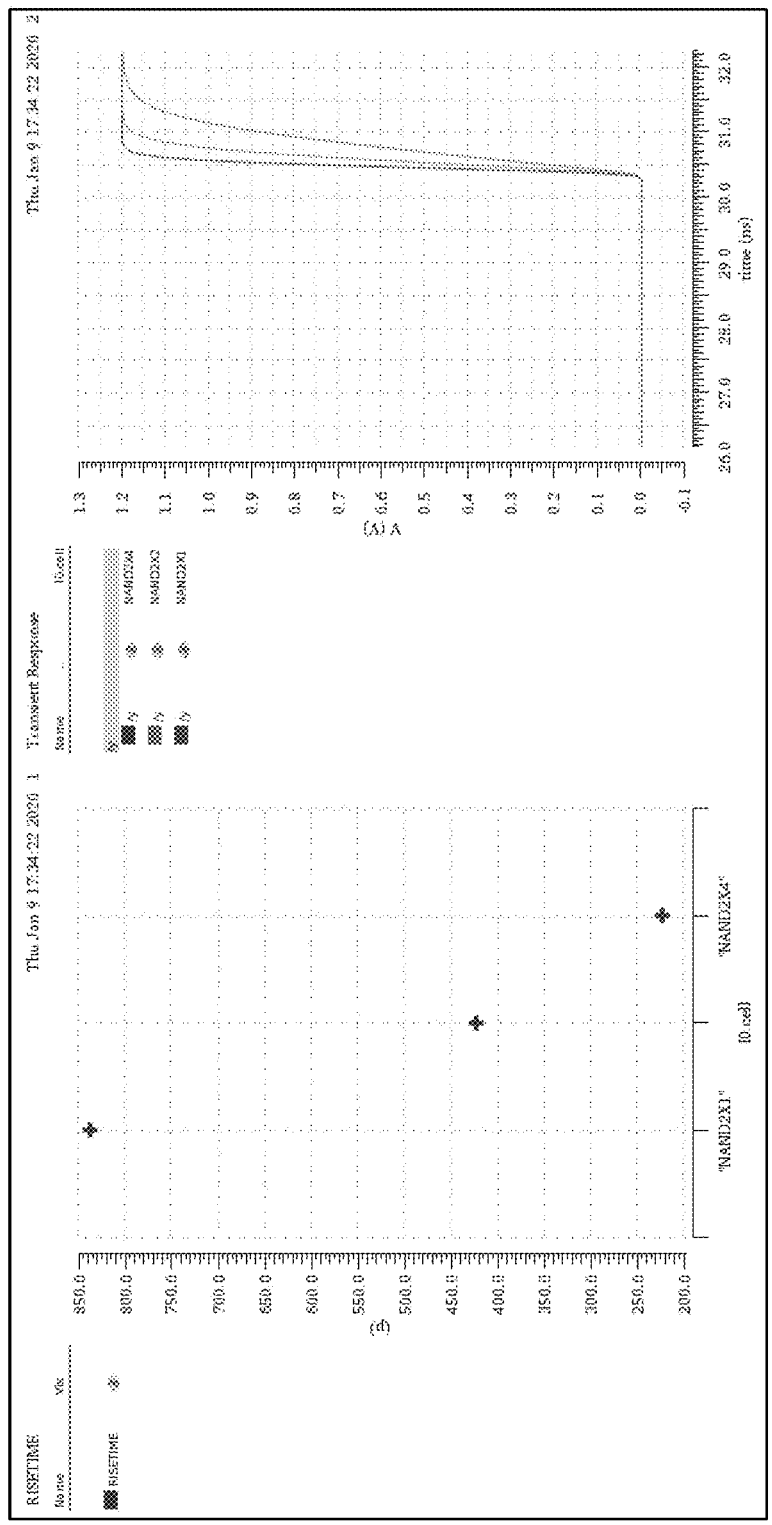

FIG. 5G illustrates a portion of another example user interface showing a result of characterizing an electronic design with efficient cell cloning in one or more embodiments. FIG. 5G illustrates the time-dependent plot of the characterization results (e.g., rise time) for each of three cell parameter values that are swept during the characterization to respectively represent similar cell instances. FIG. 5G further illustrates that the three results are correlated with each other temporally.

Figure 5H:
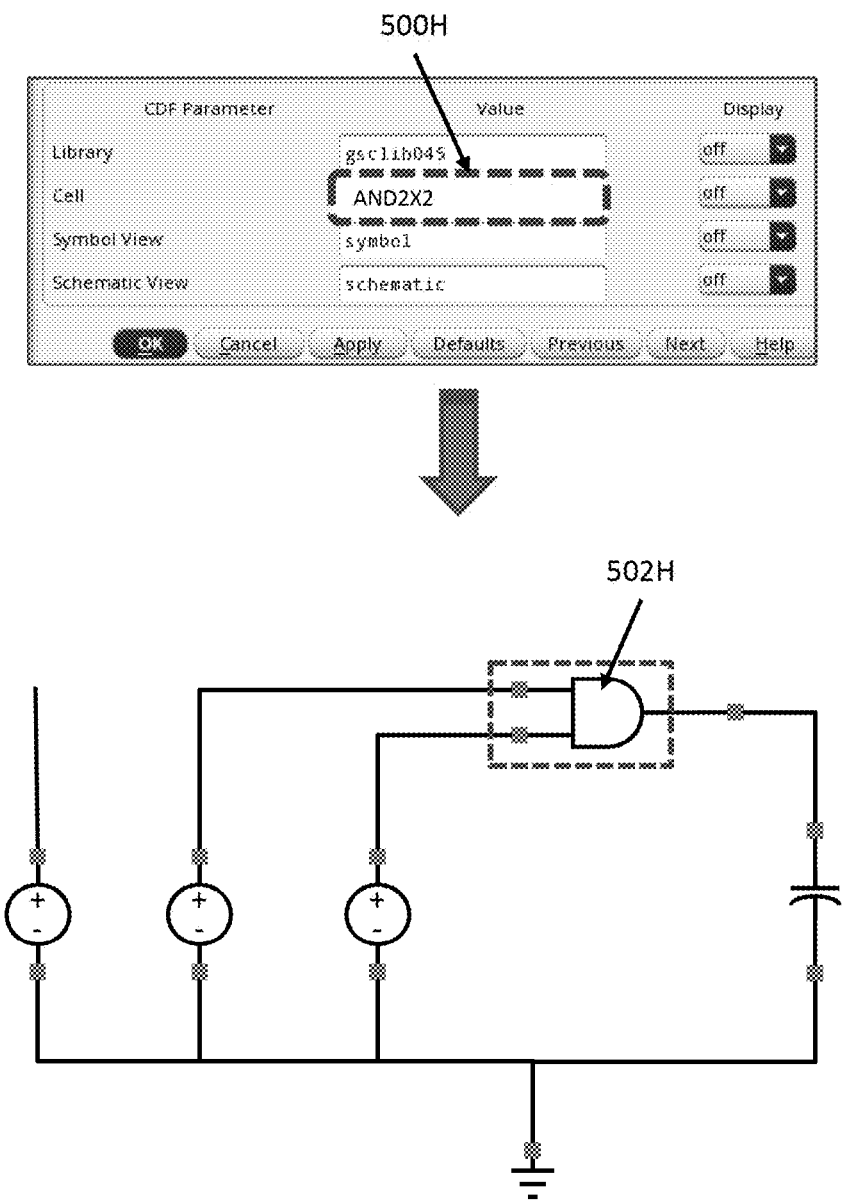

FIG. 5H illustrates an example of efficient cell cloning of multiple instances by using a schematic parameterized cell and a symbol parameterized cell in one or more embodiments. FIG. 5H illustrates another example where a "CellSwap" component may be instantiated as an AND gate by passing a different cell parameter value 500H (e.g., AND2X2 in FIG. 5H) into the cell parameter of the symbol parameterized cell, a different graphic representation (e.g., a graphical symbol identical or similar to a schematic symbol) 502H to replaces the original graphical representation corresponding to the overwritten cell parameter value. In this example, as the cell parameter value "AND2X2" 500H is passed into the symbol parameterized cell instance, the original graphical representation (e.g., an OR gate 502C in FIG. 5C or a NAND gate symbol 508A in FIG. 5A) of the original instance having the corresponding cell parameter value is replaced with the graphical representation of an AND gate symbol 502H in FIG. 5H.

Figure 5I:
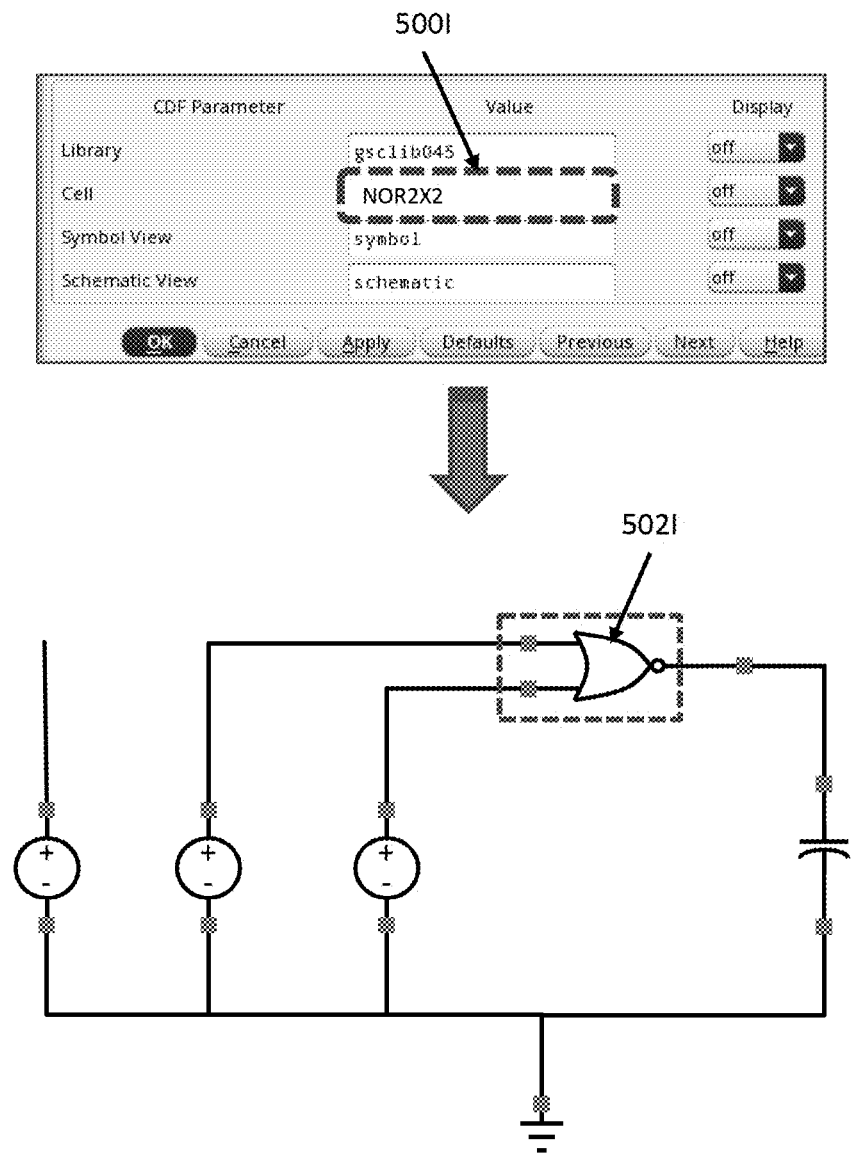
Figure 5J:
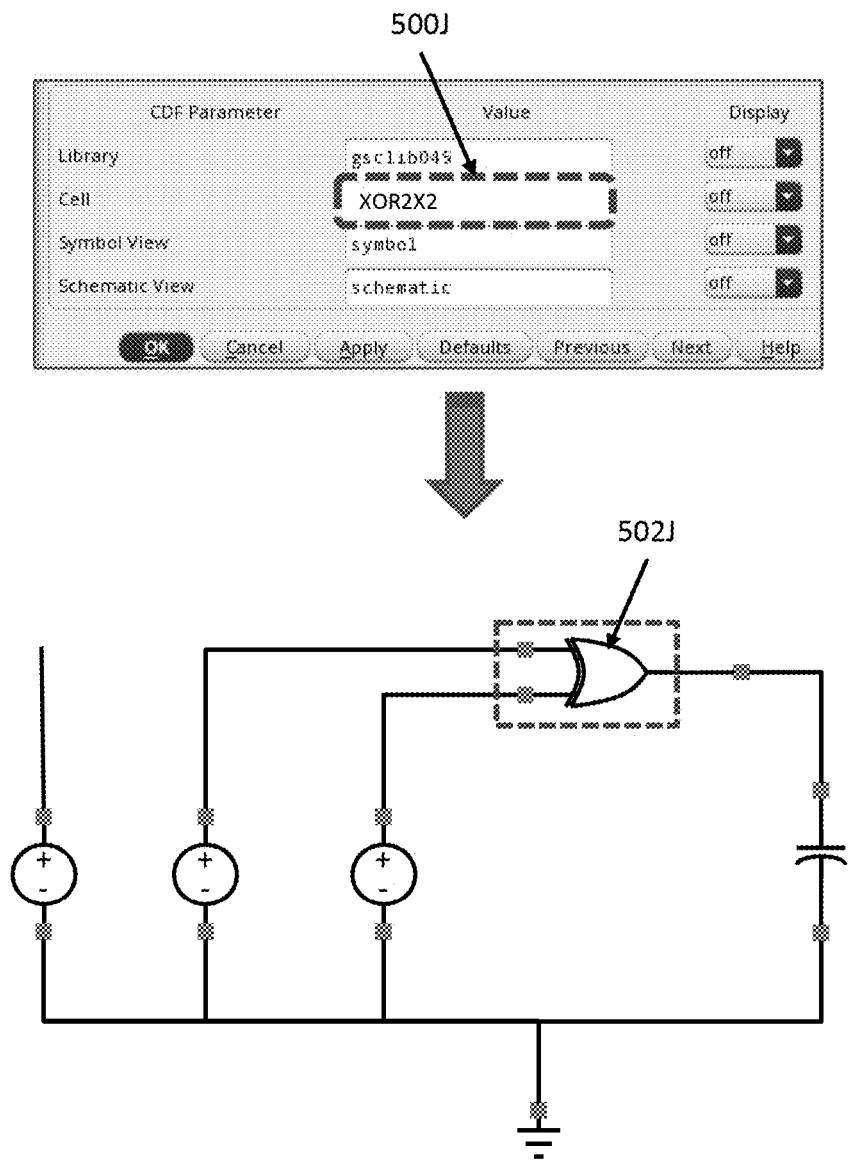

FIG. 5I illustrates another example of efficient cell cloning of multiple instances by using a schematic parameterized cell and a symbol parameterized cell in one or more embodiments. More specifically, FIG. 5I illustrates that as a different cell parameter value 500I (e.g., NOR2X2 in FIG. 5I) is passed into the cell parameter of the symbol parameterized cell, the "CellSwap" component is instantiated with a different graphic representation (e.g., a symbol) 502I that replaces the original graphical representation corresponding to the overwritten cell parameter value. In this example, as the cell parameter value "NOR2X2" 500I is passed into the symbol parameterized cell instance of the "CellSwap" component, the original graphical representation (e.g., an OR gate 502C in FIG. 5C, a NAND gate symbol 508A in FIG. 5A, or the AND gate symbol 502H in FIG. 5H) is replaced with the graphical representation of a NOR gate symbol 502I in FIG. 5I.

FIG. 5J illustrates yet another example of efficient cell cloning of multiple instances by using a schematic parameterized cell and a symbol parameterized cell in one or more embodiments. More specifically, FIG. 5J illustrates that as a different cell parameter value 500J (e.g., XOR2X2 in FIG. 5J) is passed into the cell parameter of the symbol parameterized cell, the "CellSwap" component is instantiated with a different graphic representation (e.g., a symbol) 502J that replaces the original graphical representation corresponding to the overwritten cell parameter value. In this example, as the cell parameter value "XOR2X2" 500J is passed into the symbol parameterized cell instance of the "CellSwap" component, the original graphical representation (e.g., an OR gate 502C in FIG. 5C, an NAND gate symbol 508A in FIG. 5A, the AND gate symbol 502H in FIG. 5H, or the NOR gate 502I in FIG. 5I) is replaced with the graphical representation of a NOR gate symbol 502J in FIG. 5J.

Various example embodiments of the disclosure are described herein. Reference is made to these examples in a non-limiting sense. Examples are provided to illustrate more broadly applicable aspects of the invention. Various changes may be made to various embodiments described herein and equivalents may be substituted without departing from the true spirit and scope of the invention. In addition, many modifications may be made to adapt a particular situation, material, composition of matter, process, process act(s) or step(s) to the objective(s), spirit or scope of the present disclosure. Further, as will be appreciated by those with skill in the art that each of the individual variations described and illustrated herein has discrete components and features which may be readily separated from or combined with the features of any of the other several embodiments without departing from the scope or spirit of the present disclosures. All such modifications are intended to be within the scope of claims associated with this disclosure.

The disclosure includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure. The above description of illustrated embodiments is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

In one embodiment, the present subject matter may be implemented via Application Specific Integrated Circuits (ASICs), Field Programmable Gate Array (FPGA), etc. However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory computer-readable medium" may be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

Many of the methods described herein can be performed with variations. For example, many of the methods may include additional acts, omit some acts, and/or perform acts in a different order than as illustrated or described. Various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Moreover, the various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

System Architecture Overview

Figure 6:
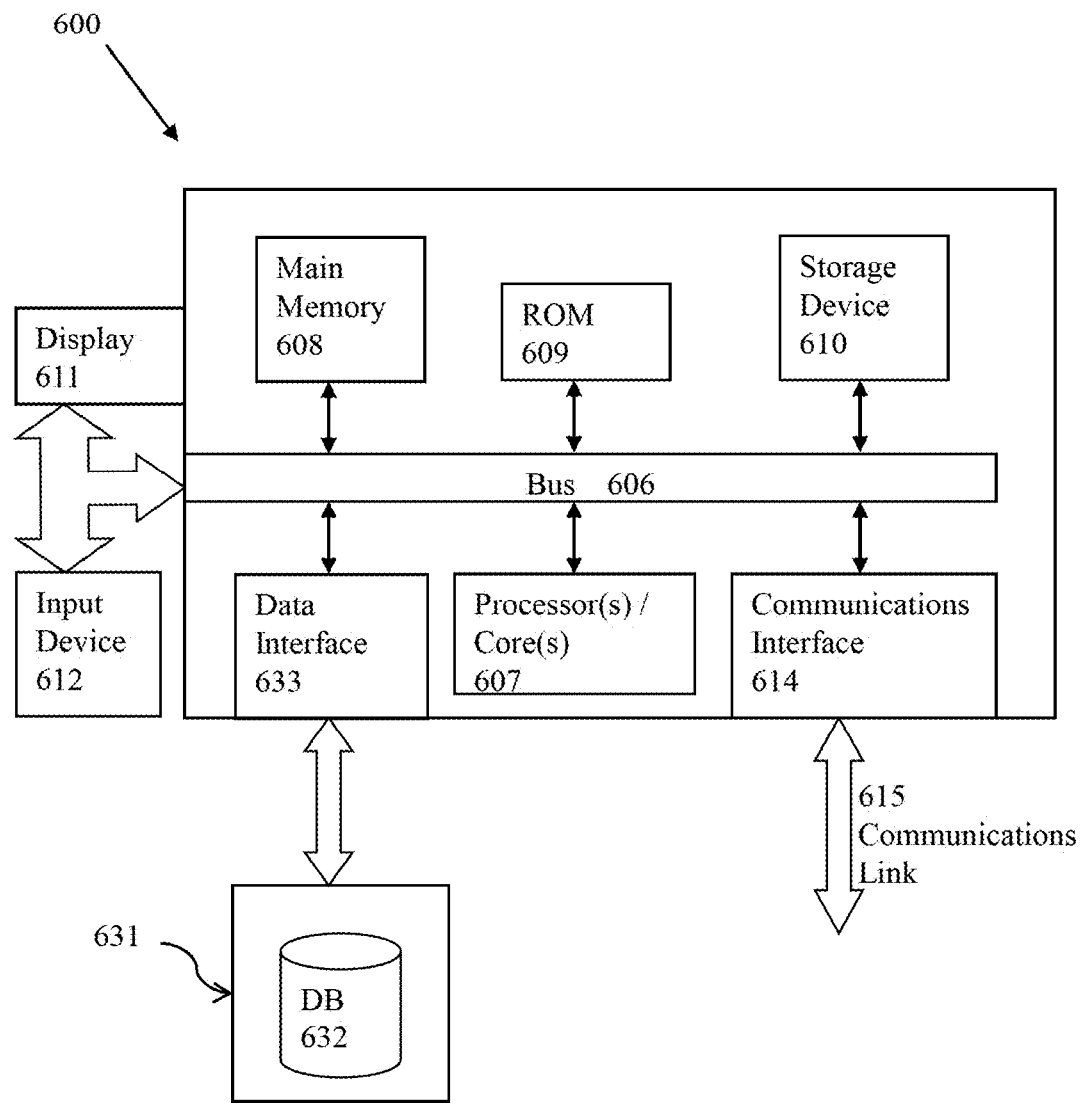
FIG. 6 illustrates a computerized system on which a process for characterizing an electronic design with efficient cell cloning may be implemented.

FIG. 6 illustrates a computerized system on which a method for characterizing an electronic design with efficient cell cloning may be implemented. Computer system 600 includes a bus 606 or other communication module for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown).

The illustrative computing system 600 may include an Internet-based computing platform providing a shared pool of configurable computer processing resources (e.g., computer networks, servers, storage, applications, services, etc.) and data to other computers and devices in a ubiquitous, on-demand basis via the Internet in some embodiments. For example, the computing system 600 may include or may be a part of a cloud computing platform (e.g., a public cloud, a hybrid cloud, etc.) where computer system resources (e.g., storage resources, computing resource, etc.) are provided on an on-demand basis, without direct, active management by the users in some embodiments.

According to one embodiment, computer system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads. For example, the acts of determination, extraction, simulating, annotating, analyzing, optimizing, and/or identifying, etc. descried herein may be performed by one or more processors, one or more processor cores, or combination thereof.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program (e.g., application code) through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that includes a database 632 that is readily accessible by the computer system 600. The computer system 600 communicates with the data storage system 631 through a data interface 633. A data interface 633, which is coupled to the bus 606 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Various example embodiments of the invention are described herein. Reference is made to these examples in a non-limiting sense. The examples described herein are provided to illustrate more broadly applicable aspects of the invention. Various changes may be made to any of the examples or embodiments described herein, and equivalents thereof may be substituted without departing from the true spirit and scope of these examples or embodiments described herein.

In addition, many modifications may be made to adapt a particular situation, material, composition of matter, system, module, process, and/or process act(s) or step(s) to the objective(s), spirit or scope of the present disclosure. Further, as will be appreciated by those with skill in the art, each of the individual variations, examples, and/or embodiments, etc. described and illustrated herein has discrete components and features which may be readily separated from or combined with the feature or features of any of the other several variations, examples, and/or embodiments, etc., without departing from the scope or spirit of various variations, examples, and/or embodiments, etc. described herein. All such modifications are intended to be within the scope of claims associated with this disclosure. Moreover, various embodiments or portion(s) thereof described herein may be combined to provide further embodiments. Any aspects of the embodiments may be modified, if necessary, to employ concepts of the various variations, examples, and/or embodiments, etc. described herein to provide yet further embodiments.

I claim:

1. A computer implemented method for characterizing an electronic design, comprising:
    identifying a cell instance that corresponds to multiple similar cell instances in a view of the electronic design, wherein the multiple similar cell instances comprise cells that share a common trait and the cell instance is instantiated from a master parameterized cell;
    configuring an analysis engine at least by associating a respective parameter of the master parameterized cell with multiple different parameter values that respectively correspond to at least one cell instance of the multiple similar cell instances; and
    generating an analysis result for respective cell instances of the multiple similar cell instances including respective metric values corresponding to the respective cell instances at least by performing an electronic design analysis that sweeps across the multiple different parameter values to generate the respective metric values corresponding to the respective cell instances.

2. The computer implemented method of claim 1, wherein identifying the cell instance comprises:
    identifying a set of parameters that is shared by the multiple similar cell instances that are different from each other; and
    determining the master parameterized cell at least by determining a symbol parameterized cell and a schematic parameterized cell.

3. The computer implemented method of claim 2, wherein identifying the set of parameters comprises:
    identifying at least one shared device characteristic; and
    identifying the set of parameters for analysis sweeping based at least in part upon the at least one shared device characteristic, wherein the set of parameters comprises at least one of a cell parameter, a library parameter, a symbol view parameter, or a schematic view parameter.

4. The computer implemented method of claim 2, wherein determining the master parameterized cell comprises:
    determining the symbol parameterized cell for the master parameterized cell; and
    determining the schematic parameterized cell for the master parameterized cell.

5. The computer implemented method of claim 4, wherein determining the symbol parameterized cell comprises:
    identifying the set of parameters, wherein the set of parameters comprises a symbol view parameter; and
    identifying a first graphical representation of a first schematic master cell that corresponds to a first symbol view parameter value of the symbol view parameter.

6. The computer implemented method of claim 5, wherein determining the symbol parameterized cell comprises:
    determining the first graphical representation at least by adding at least some connectivity information of a first symbol master to the first graphical representation.

7. The computer implemented method of claim 6, wherein determining the first graphical representation comprises:
    copying or linking at least some of the connectivity information pertaining to the first symbol master to the first graphical representation.

8. The computer implemented method of claim 6, wherein determining the first graphical representation comprises:
    flattening a hierarchical level of the first symbol master to identify contents in the hierarchical level that has been flattened; and
    copying or linking the contents in the hierarchical level to the first graphical representation.

9. The computer implemented method of claim 8, wherein determining the first graphical representation further comprises:
    copying or linking at least some missing contents that are not captured by flattening the hierarchical level to the first graphical representation.

10. The computer implemented method of claim 6, wherein determining the symbol parameterized cell further comprises:
    adding or linking a first source label that is linked to the first symbol view parameter value or the first symbol master to the first graphical representation.

11. The computer implemented method of claim 4, wherein determining the schematic parameterized cell comprises:
    identifying the set of parameters, wherein the set of parameters comprises a schematic view parameter;
    identifying first schematic view contents of a first schematic master cell that corresponds to a first schematic view parameter value of the schematic view parameter; and
    adding or linking at least some of the first schematic view contents to the schematic parameterized cell that corresponds to the first schematic view parameter value.

12. The computer implemented method of claim 11, wherein adding or linking the at least some of the first schematic view contents comprises:
    copying or linking the at least some of the first schematic view contents from the first schematic master cell to the schematic parameterized cell with respect to the first schematic view parameter value of the schematic view parameter.

13. The computer implemented method of claim 11, wherein adding or linking the at least some of the first schematic view contents comprises:
    flattening a hierarchical level of the first schematic master cell to identify contents in the hierarchical level that has been flattened; and
    copying or linking the contents in the hierarchical level to the schematic parameterized cell.

14. The computer implemented method of claim 13, wherein determining the schematic parameterized cell further comprises:
    copying or linking at least some missing contents that are not captured by flattening the hierarchical level to the schematic parameterized cell; and
    adding or linking a first source label that is linked to the first schematic view parameter value or the first schematic master cell to the schematic parameterized cell.

15. A system for characterizing an electronic design, comprising:
    a processor; and a non-transitory storage medium having stored thereupon a sequence of instructions which, when executed by the processor, causes a set of acts comprising:
    identifying a cell instance that corresponds to multiple similar cell instances in a view of the electronic design, wherein the multiple similar cell instances comprise cells that share a common trait and the cell instance is instantiated from a master parameterized cell;
    configuring an analysis engine at least by associating a respective parameter of the master parameterized cell with multiple different parameter values that respectively correspond to at least one cell instance of the multiple similar cell instances; and
    generating an analysis result for respective cell instances of the multiple similar cell instances including respective metric values corresponding to the respective cell instances at least by performing an electronic design analysis that sweeps across the multiple different parameter values to generate the respective metric values corresponding to the respective cell instances.

16. The system for claim 15, wherein the set of acts further comprise:
    identifying a set of parameters that is shared by the multiple similar cell instances that are different from each other; and
    determining the master parameterized cell at least by determining a symbol parameterized cell and a schematic parameterized cell.

17. The system for claim 16, wherein the symbol parameterized cell is determined at least by:
    identifying the set of parameters, wherein the set of parameters comprises a symbol view parameter;
    identifying a first graphical representation of a first schematic master cell that corresponds to a first symbol view parameter value of the symbol view parameter; and
    determining the first graphical representation at least by adding at least some connectivity information of the first schematic master cell to the first graphical representation, wherein determining the first graphical representation comprises:
        a first process comprising:
            copying or linking at least some of the connectivity information pertaining to a first symbol master to the first graphical representation; or
        a second process comprising:
            flattening a hierarchical level of the first symbol master to identify contents in the hierarchical level that has been flattened; and
            copying or linking the contents in the hierarchical level to the first graphical representation;
            copying or linking at least some missing contents that are not captured by flattening the hierarchical level to the first graphical representation.

18. A non-transitory computer readable medium having stored thereupon a sequence of instructions which, when executed by at least one processor causes a set of acts for characterizing an electronic design, the set of acts comprising:
    identifying a cell instance that corresponds to multiple similar cell instances in a view of the electronic design, wherein the multiple similar cell instances comprise cells that share a common trait and the cell instance is instantiated from a master parameterized cell;
    configuring an analysis engine at least by associating a respective parameter of the master parameterized cell with multiple different parameter values that respectively correspond to at least one cell instance of the multiple similar cell instances; and
    generating an analysis result for respective cell instances of the multiple similar cell instances including respective metric values corresponding to the respective cell instances at least by performing an electronic design analysis that sweeps across the multiple different parameter values to generate the respective metric values corresponding to the respective cell instances.

19. The non-transitory computer readable medium of claim 18, wherein the set of acts further comprise:
    identifying a set of parameters that is shared by the multiple similar cell instances that are different from each other; and
    determining the master parameterized cell at least by determining a symbol parameterized cell and a schematic parameterized cell.

20. The non-transitory computer readable medium of claim 19, wherein the set of acts further comprise:
    identifying the set of parameters, wherein the set of parameters comprises a schematic view parameter;
    identifying first schematic view contents of a first schematic master cell that corresponds to a first schematic view parameter value of the schematic view parameter; and
    adding or linking at least some of the first schematic view contents to the schematic parameterized cell that corresponds to the first schematic view parameter value, wherein adding or linking the at least some of the first schematic view contents comprises:
        a first processing comprising copying or linking the at least some of the first schematic view contents from the first schematic master cell to the schematic parameterized cell with respect to the first schematic view parameter value of the schematic view parameter; or
        a second process comprising:
            flattening a hierarchical level of the first schematic master cell to identify contents in the hierarchical level that has been flattened;
            copying or linking the contents in the hierarchical level to the schematic parameterized cell; and
            copying or linking at least some missing contents that are not captured by flattening the hierarchical level to the schematic parameterized cell.

* * * * *